(12) United States Patent
Hecht et al.

(10) Patent No.: US 12,229,735 B1
(45) Date of Patent: Feb. 18, 2025

(54) MULTI-MODAL PARAMETERIZATION OF DIGITAL TOKENS INVOLVING MULTIPLE ENTITIES IN DEFINED NETWORKS

(71) Applicant: Wells Fargo Bank, N.A., San Francisco, CA (US)

(72) Inventors: Alan W. Hecht, Chanhassen, MN (US); Robert Jacobs, San Francisco, CA (US); Adam E. Vancini, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/888,788

(22) Filed: Aug. 16, 2022

Related U.S. Application Data

(60) Provisional application No. 63/234,091, filed on Aug. 17, 2021.

(51) Int. Cl.
*G06Q 20/06* (2012.01)

(52) U.S. Cl.
CPC .................................. *G06Q 20/06* (2013.01)

(58) Field of Classification Search
CPC ..................................................... G06Q 20/06
USPC ......................................................... 705/39
See application file for complete search history.

(56) References Cited

U.S. PATENT DOCUMENTS

| | | | |
|---|---|---|---|
| 5,412,192 A | 5/1995 | Hoss | |
| 5,778,067 A | 7/1998 | Jones et al. | |
| 5,953,710 A | 9/1999 | Fleming | |
| 6,016,484 A | 1/2000 | Williams et al. | |
| 6,353,811 B1 | 3/2002 | Weissman | |
| 6,615,194 B1 | 9/2003 | Deutsch et al. | |
| 6,865,547 B1 | 3/2005 | Brake et al. | |
| 6,873,974 B1 | 3/2005 | Schutzer | |
| 6,993,510 B2 | 1/2006 | Guy et al. | |
| 7,086,586 B1 | 8/2006 | Sullivan | |
| 7,287,695 B2 | 10/2007 | Wankmueller | |
| 7,395,243 B1 | 7/2008 | Zielke et al. | |
| 7,398,919 B2 | 7/2008 | Cooper | |
| 7,400,883 B2 | 7/2008 | Rivers et al. | |
| 7,631,803 B2 | 12/2009 | Peyret et al. | |
| 7,757,944 B2 | 7/2010 | Cline et al. | |
| 7,774,274 B2 | 8/2010 | Jones et al. | |
| 7,822,206 B2 | 10/2010 | Birk et al. | |
| 7,827,057 B1 | 11/2010 | Walker et al. | |

(Continued)

FOREIGN PATENT DOCUMENTS

| | | |
|---|---|---|
| JP | 2002-312554 A | 10/2002 |
| KR | 20090014076 A | 2/2009 |

(Continued)

OTHER PUBLICATIONS

"Wang et al. Mobile payment security, threats, and challenges, Mar. 24, 2016, IEEE Xplore, Entire document" (Year: 2016).

(Continued)

*Primary Examiner* — Clifford B Madamba
(74) *Attorney, Agent, or Firm* — Foley & Lardner LLP

(57) ABSTRACT

Disclosed is an approach that enables generation of parameterized digital tokens for unique tags in, for example, digital payment platforms. The unique tags may be agnostic to accounts, such that they do not require changes to administration or ownership of existing accounts, which may be held at different institutions.

20 Claims, 10 Drawing Sheets

(56) References Cited

U.S. PATENT DOCUMENTS

| | | |
|---|---|---|
| 7,860,790 B2 | 12/2010 | Monk |
| 7,909,243 B2 | 3/2011 | Merkow et al. |
| 7,925,285 B2 | 4/2011 | Indirabhai |
| 7,930,225 B2 | 4/2011 | Wahlberg et al. |
| 7,945,776 B1 | 5/2011 | Atzmony et al. |
| 7,958,049 B2 | 6/2011 | Jamison et al. |
| 7,970,669 B1 | 6/2011 | Santos |
| 8,019,365 B2 | 9/2011 | Fisher |
| 8,078,140 B2 | 12/2011 | Baker et al. |
| 8,126,806 B1 | 2/2012 | Dimartino et al. |
| 8,160,959 B2 | 4/2012 | Rackley et al. |
| 8,215,560 B2 | 7/2012 | Granucci et al. |
| 8,266,058 B1 | 9/2012 | Anderson |
| 8,280,788 B2 | 10/2012 | Perlman |
| 8,401,904 B1 | 3/2013 | Simakov et al. |
| 8,433,657 B2 | 4/2013 | Dinan |
| 8,452,257 B2 | 5/2013 | Granucci et al. |
| 8,459,544 B2 * | 6/2013 | Casey ............... G06Q 20/2295 235/382.5 |
| 8,467,766 B2 | 6/2013 | Rackley et al. |
| 8,468,587 B2 | 6/2013 | Blinn et al. |
| 8,489,067 B2 | 7/2013 | Rackley, III et al. |
| 8,504,699 B2 | 8/2013 | Vaughan et al. |
| 8,533,123 B2 | 9/2013 | Hart |
| 8,538,845 B2 | 9/2013 | Liberty |
| 8,548,908 B2 | 10/2013 | Friedman |
| 8,555,361 B2 | 10/2013 | Nakhjiri et al. |
| 8,566,237 B2 | 10/2013 | Forzley |
| 8,566,239 B2 | 10/2013 | Arthur et al. |
| 8,571,953 B2 | 10/2013 | Gopalakrishnan et al. |
| 8,589,290 B2 | 11/2013 | Baskerville |
| 8,615,468 B2 | 12/2013 | Varadarajan |
| 8,626,632 B1 | 1/2014 | Dolan et al. |
| 8,627,424 B1 | 1/2014 | O'Malley et al. |
| 8,635,131 B1 | 1/2014 | Saunders |
| 8,639,621 B1 | 1/2014 | Ellis et al. |
| 8,645,971 B2 | 2/2014 | Carlson et al. |
| 8,676,704 B2 | 3/2014 | Ledbetter et al. |
| 8,682,802 B1 | 3/2014 | Kannanari |
| 8,700,729 B2 | 4/2014 | Dua |
| 8,706,628 B1 | 4/2014 | Phillips |
| 8,725,576 B2 | 5/2014 | Fisher |
| 8,725,577 B2 | 5/2014 | Fisher |
| 8,732,080 B2 | 5/2014 | Karim |
| 8,744,966 B1 | 6/2014 | Amacker et al. |
| 8,750,901 B1 | 6/2014 | Gupta et al. |
| 8,762,265 B2 | 6/2014 | Kessler et al. |
| 8,762,270 B1 | 6/2014 | Evans et al. |
| 8,768,830 B1 | 7/2014 | Jorgensen et al. |
| 8,768,834 B2 | 7/2014 | Zacarias et al. |
| 8,774,781 B1 | 7/2014 | Speiser et al. |
| 8,781,955 B2 | 7/2014 | Schamer et al. |
| 8,831,677 B2 | 9/2014 | Villa-Real |
| 8,838,501 B1 | 9/2014 | Priebatsch |
| 8,843,125 B2 | 9/2014 | Kwon et al. |
| 8,843,417 B2 | 9/2014 | Hammad |
| 8,880,432 B2 | 11/2014 | Collins, Jr. |
| 8,924,246 B1 | 12/2014 | Chen et al. |
| 8,925,805 B2 | 1/2015 | Grigg et al. |
| 8,930,271 B1 | 1/2015 | Ellis et al. |
| 8,972,297 B2 | 3/2015 | Kay et al. |
| 8,977,251 B2 | 3/2015 | Grigg et al. |
| 8,989,712 B2 | 3/2015 | Wentker et al. |
| 9,020,836 B2 | 4/2015 | Fisher et al. |
| 9,026,460 B2 | 5/2015 | Grigg et al. |
| 9,027,109 B2 | 5/2015 | Wolberg-Stok et al. |
| 9,031,880 B2 | 5/2015 | Bishop et al. |
| 9,037,509 B1 | 5/2015 | Ellis et al. |
| 9,043,240 B2 | 5/2015 | Langus et al. |
| 9,043,605 B1 | 5/2015 | Machani |
| 9,098,190 B2 | 8/2015 | Zhou et al. |
| 9,111,266 B2 | 8/2015 | Kessler et al. |
| 9,117,242 B1 | 8/2015 | Ellis et al. |
| 9,177,307 B2 | 11/2015 | Ross et al. |
| 9,208,488 B2 | 12/2015 | Liberty |
| 9,208,528 B2 | 12/2015 | Chelst et al. |
| 9,218,624 B2 | 12/2015 | Moghadam |
| 9,256,876 B2 | 2/2016 | Vasant Akole et al. |
| 9,286,606 B2 | 3/2016 | Diamond |
| 9,324,068 B2 | 4/2016 | Soundararajan |
| 9,361,616 B2 | 6/2016 | Zhou et al. |
| 9,424,572 B2 | 8/2016 | Bondesen et al. |
| 9,473,491 B1 | 10/2016 | Johansson et al. |
| 9,652,770 B1 | 5/2017 | Kurani et al. |
| 9,659,312 B1 | 5/2017 | Ellis et al. |
| 9,691,058 B2 | 6/2017 | Epler et al. |
| 9,704,157 B1 | 7/2017 | Ellis et al. |
| 9,741,051 B2 | 8/2017 | Carpenter et al. |
| 9,785,934 B2 | 10/2017 | Davis et al. |
| 9,805,363 B1 | 10/2017 | Rudnick et al. |
| 9,818,109 B2 * | 11/2017 | Loh ..................... G06Q 20/382 |
| 9,928,518 B1 | 3/2018 | Vippagunta et al. |
| 9,972,047 B1 | 5/2018 | Elliott et al. |
| 10,019,740 B2 | 7/2018 | Simantov et al. |
| 10,037,561 B1 | 7/2018 | Hecht |
| 10,115,112 B2 | 10/2018 | Fordyce, III |
| 10,121,129 B2 | 11/2018 | Kalgi |
| 10,223,710 B2 | 3/2019 | Purves et al. |
| 10,235,668 B1 | 3/2019 | Ellis et al. |
| 10,242,368 B1 | 3/2019 | Poole |
| 10,380,583 B1 | 8/2019 | Ellis et al. |
| 10,380,596 B1 | 8/2019 | Butler et al. |
| 10,395,247 B2 | 8/2019 | Gilliam et al. |
| 10,402,897 B1 | 9/2019 | Capital |
| 10,445,739 B1 | 10/2019 | Sahni et al. |
| 10,467,615 B1 | 11/2019 | Omojola et al. |
| 10,515,356 B2 | 12/2019 | Cronic et al. |
| 10,565,558 B2 | 2/2020 | Fredericks et al. |
| 10,586,236 B2 | 3/2020 | Pourfallah et al. |
| 10,600,128 B2 | 3/2020 | Graham et al. |
| 10,817,950 B1 | 10/2020 | Iqbal et al. |
| 10,853,787 B1 | 12/2020 | Mango |
| 10,887,301 B1 | 1/2021 | Vera et al. |
| 10,997,592 B1 | 5/2021 | Kurani |
| 11,042,882 B2 | 6/2021 | Ledford et al. |
| 11,068,866 B1 | 7/2021 | Hecht et al. |
| 11,113,695 B2 | 9/2021 | Shah et al. |
| 11,144,902 B2 | 10/2021 | Gaddam et al. |
| 11,151,546 B2 | 10/2021 | Mossoba et al. |
| 11,210,715 B2 | 12/2021 | Lindsey et al. |
| 11,227,064 B1 * | 1/2022 | Fakhraie ............... H04L 63/101 |
| 11,228,660 B2 | 1/2022 | Rapaka et al. |
| 11,270,293 B2 * | 3/2022 | Salama ............... G06Q 20/326 |
| 11,288,660 B1 | 3/2022 | Kurani |
| 11,295,294 B1 | 4/2022 | Kurani et al. |
| 11,334,579 B1 | 5/2022 | Quade et al. |
| 11,416,766 B2 | 8/2022 | Chao et al. |
| 11,422,393 B2 | 8/2022 | Stray et al. |
| 11,436,581 B1 | 9/2022 | Walker et al. |
| 11,551,190 B1 | 1/2023 | Clements et al. |
| 11,682,005 B2 | 6/2023 | Hunter et al. |
| 2002/0032602 A1 | 3/2002 | Lanzillo et al. |
| 2002/0052852 A1 | 5/2002 | Bozeman |
| 2002/0062249 A1 | 5/2002 | Iannacci |
| 2002/0095386 A1 * | 7/2002 | Maritzen .................. G07F 7/08 705/64 |
| 2002/0174016 A1 | 11/2002 | Cuervo |
| 2002/0198829 A1 | 12/2002 | Ludwig et al. |
| 2003/0028481 A1 | 2/2003 | Flitcroft et al. |
| 2003/0040964 A1 | 2/2003 | Lacek |
| 2003/0055785 A1 | 3/2003 | Lahiri |
| 2003/0056096 A1 | 3/2003 | Albert et al. |
| 2003/0172039 A1 | 9/2003 | Guy et al. |
| 2004/0088349 A1 | 5/2004 | Beck et al. |
| 2004/0230535 A1 | 11/2004 | Binder et al. |
| 2004/0236632 A1 | 11/2004 | Maritzen et al. |
| 2004/0254848 A1 | 12/2004 | Golan et al. |
| 2004/0260646 A1 | 12/2004 | Berardi et al. |
| 2005/0021401 A1 | 1/2005 | Postrel |
| 2005/0021457 A1 | 1/2005 | Johnson et al. |
| 2005/0043997 A1 | 2/2005 | Sahota et al. |
| 2005/0077350 A1 | 4/2005 | Courtion et al. |
| 2005/0086492 A1 | 4/2005 | Nicodemus et al. |
| 2005/0125317 A1 | 6/2005 | Winkelman et al. |

(56) References Cited

U.S. PATENT DOCUMENTS

| | | |
|---|---|---|
| 2005/0125668 A1 | 6/2005 | Botz |
| 2005/0133590 A1 | 6/2005 | Rettenmyer et al. |
| 2005/0138377 A1 | 6/2005 | First et al. |
| 2005/0184145 A1 | 8/2005 | Law et al. |
| 2005/0235363 A1 | 10/2005 | Hibbard et al. |
| 2006/0129502 A1 | 6/2006 | Pastusiak et al. |
| 2006/0229985 A1 | 10/2006 | Lalwani et al. |
| 2006/0253335 A1 | 11/2006 | Keena et al. |
| 2007/0125840 A1 | 6/2007 | Law |
| 2007/0162369 A1 | 7/2007 | Hardison |
| 2007/0168354 A1 | 7/2007 | Ramer et al. |
| 2007/0170243 A1 | 7/2007 | Desany et al. |
| 2007/0174166 A1 | 7/2007 | Jones |
| 2007/0174873 A1 | 7/2007 | Griggs |
| 2007/0198432 A1 | 8/2007 | Pitroda |
| 2007/0244811 A1 | 10/2007 | Tumminaro |
| 2007/0250923 A1 | 10/2007 | M'Raihi |
| 2007/0262140 A1 | 11/2007 | Long |
| 2008/0006685 A1 | 1/2008 | Rackley, III et al. |
| 2008/0033878 A1 | 2/2008 | Krikorian et al. |
| 2008/0127317 A1 | 5/2008 | Nakhjiri |
| 2008/0134295 A1 | 6/2008 | Bailey et al. |
| 2008/0203152 A1 | 8/2008 | Hammad et al. |
| 2008/0208742 A1 | 8/2008 | Arthur et al. |
| 2008/0242274 A1 | 10/2008 | Swanburg et al. |
| 2008/0294556 A1 | 11/2008 | Anderson |
| 2008/0319887 A1 | 12/2008 | Pizzi et al. |
| 2009/0027191 A1 | 1/2009 | Farah et al. |
| 2009/0043695 A1 | 2/2009 | Hickey |
| 2009/0048971 A1 | 2/2009 | Hathaway et al. |
| 2009/0063178 A1 | 3/2009 | Pousti et al. |
| 2009/0076950 A1 | 3/2009 | Chang et al. |
| 2009/0106558 A1 | 4/2009 | Delgrosso et al. |
| 2009/0157531 A1 | 6/2009 | Bui |
| 2009/0177563 A1 | 7/2009 | Bernstein et al. |
| 2009/0192873 A1 | 7/2009 | Marble |
| 2009/0271287 A1 | 10/2009 | Halpern |
| 2009/0281941 A1 | 11/2009 | Worth |
| 2009/0281951 A1 | 11/2009 | Shakkarwar |
| 2009/0319409 A1 | 12/2009 | Omidyar |
| 2009/0319427 A1 | 12/2009 | Gardner et al. |
| 2009/0327010 A1 | 12/2009 | Vadhri |
| 2009/0327151 A1 | 12/2009 | Carlson et al. |
| 2010/0057553 A1 | 3/2010 | Ameiss et al. |
| 2010/0063906 A1 | 3/2010 | Nelsen et al. |
| 2010/0076833 A1 | 3/2010 | Nelsen |
| 2010/0088188 A1 | 4/2010 | Kumar et al. |
| 2010/0114724 A1 | 5/2010 | Ghosh et al. |
| 2010/0114731 A1 | 5/2010 | Kingston et al. |
| 2010/0114733 A1 | 5/2010 | Collas et al. |
| 2010/0125495 A1 | 5/2010 | Smith et al. |
| 2010/0125510 A1 | 5/2010 | Smith et al. |
| 2010/0131415 A1 | 5/2010 | Sartipi |
| 2010/0191602 A1 | 7/2010 | Mikkelsen et al. |
| 2010/0205077 A1 | 8/2010 | Hammad |
| 2010/0274655 A1 | 10/2010 | Postrel |
| 2010/0280896 A1 | 11/2010 | Postrel |
| 2010/0325048 A1 | 12/2010 | Carlson et al. |
| 2010/0332386 A1 | 12/2010 | Vancini et al. |
| 2011/0055080 A1 | 3/2011 | Ahlers et al. |
| 2011/0071914 A1 | 3/2011 | Beasley et al. |
| 2011/0106601 A1 | 5/2011 | Perlman et al. |
| 2011/0106674 A1 | 5/2011 | Perlman |
| 2011/0137797 A1 | 6/2011 | Stals et al. |
| 2011/0153397 A1 | 6/2011 | Wagenheim |
| 2011/0191160 A1 | 8/2011 | Blackhurst et al. |
| 2011/0196782 A1 | 8/2011 | Allen et al. |
| 2011/0251892 A1 | 10/2011 | Laracey |
| 2011/0270665 A1 | 11/2011 | Kim et al. |
| 2011/0270748 A1 | 11/2011 | Graham et al. |
| 2011/0270749 A1 | 11/2011 | Bennett et al. |
| 2011/0276489 A1 | 11/2011 | Larkin |
| 2011/0289004 A1 | 11/2011 | Prakash et al. |
| 2011/0295748 A1 | 12/2011 | Woodriffe |
| 2011/0295749 A1 | 12/2011 | Scalisi |
| 2011/0313918 A1 | 12/2011 | Lawson et al. |
| 2011/0320344 A1 | 12/2011 | Faith et al. |
| 2012/0011063 A1 | 1/2012 | Killian et al. |
| 2012/0018511 A1 | 1/2012 | Hammad |
| 2012/0078735 A1 | 3/2012 | Bauer et al. |
| 2012/0078751 A1 | 3/2012 | Macphail et al. |
| 2012/0084210 A1 | 4/2012 | Farahmand |
| 2012/0110634 A1 | 5/2012 | Jakobsson |
| 2012/0130731 A1 | 5/2012 | Canetto |
| 2012/0130887 A1 | 5/2012 | Meckling |
| 2012/0143705 A1 | 6/2012 | Bhattacharya et al. |
| 2012/0150687 A1 | 6/2012 | Hart |
| 2012/0158589 A1 | 6/2012 | Katzin et al. |
| 2012/0185317 A1 | 7/2012 | Wong |
| 2012/0185387 A1 | 7/2012 | Doyle |
| 2012/0196586 A1 | 8/2012 | Grigg et al. |
| 2012/0197793 A1 | 8/2012 | Grigg et al. |
| 2012/0197794 A1 | 8/2012 | Grigg et al. |
| 2012/0209749 A1 | 8/2012 | Hammad et al. |
| 2012/0233005 A1 | 9/2012 | White |
| 2012/0239417 A1 | 9/2012 | Pourfallah et al. |
| 2012/0253852 A1 | 10/2012 | Pourfallah et al. |
| 2012/0253913 A1 | 10/2012 | Richard |
| 2012/0254021 A1 | 10/2012 | Wohied et al. |
| 2012/0271712 A1 | 10/2012 | Katzin et al. |
| 2012/0284130 A1 | 11/2012 | Lewis et al. |
| 2012/0284195 A1 | 11/2012 | McMillen et al. |
| 2012/0290376 A1 | 11/2012 | Dryer et al. |
| 2012/0296720 A1 | 11/2012 | Pirillo |
| 2012/0301774 A1 | 11/2012 | Jiang et al. |
| 2012/0303425 A1 | 11/2012 | Katzin et al. |
| 2012/0310774 A1 | 12/2012 | Chassin |
| 2012/0323717 A1 | 12/2012 | Kirsch |
| 2012/0323762 A1 | 12/2012 | Kapur et al. |
| 2012/0330837 A1 | 12/2012 | Persaud et al. |
| 2013/0006848 A1 | 1/2013 | Kuttuva |
| 2013/0013509 A1 | 1/2013 | Perlman et al. |
| 2013/0018777 A1 | 1/2013 | Klein |
| 2013/0018786 A1 | 1/2013 | Sher |
| 2013/0018791 A1 | 1/2013 | Mendicino et al. |
| 2013/0018792 A1 | 1/2013 | Casey et al. |
| 2013/0024364 A1 | 1/2013 | Shrivastava et al. |
| 2013/0030941 A1 | 1/2013 | Meredith et al. |
| 2013/0042261 A1 | 2/2013 | Tavormina et al. |
| 2013/0054336 A1 | 2/2013 | Graylin |
| 2013/0054454 A1 | 2/2013 | Purves et al. |
| 2013/0054469 A1* | 2/2013 | Agashe ............... G06Q 20/20 705/67 |
| 2013/0060679 A1 | 3/2013 | Oskolkov et al. |
| 2013/0060689 A1 | 3/2013 | Oskolkov et al. |
| 2013/0060696 A1 | 3/2013 | Martin et al. |
| 2013/0060708 A1 | 3/2013 | Oskolkov et al. |
| 2013/0065555 A1 | 3/2013 | Baker et al. |
| 2013/0073365 A1 | 3/2013 | McCarthy |
| 2013/0073459 A1 | 3/2013 | Zacarias et al. |
| 2013/0074168 A1 | 3/2013 | Hao et al. |
| 2013/0080241 A1 | 3/2013 | Fisher |
| 2013/0080323 A1 | 3/2013 | Scipioni |
| 2013/0110628 A1 | 5/2013 | Yeo et al. |
| 2013/0110658 A1 | 5/2013 | Lyman et al. |
| 2013/0132275 A1 | 5/2013 | Enzaldo et al. |
| 2013/0132854 A1 | 5/2013 | Raleigh et al. |
| 2013/0144663 A1 | 6/2013 | Qawami et al. |
| 2013/0144702 A1 | 6/2013 | Tabor et al. |
| 2013/0151400 A1 | 6/2013 | Makhotin et al. |
| 2013/0166332 A1 | 6/2013 | Hammad |
| 2013/0168450 A1 | 7/2013 | Von Mueller et al. |
| 2013/0173456 A1 | 7/2013 | Grigg et al. |
| 2013/0173474 A1 | 7/2013 | Ranganathan et al. |
| 2013/0179336 A1 | 7/2013 | Lyons et al. |
| 2013/0179352 A1 | 7/2013 | Dwyre et al. |
| 2013/0185167 A1 | 7/2013 | Mestre et al. |
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226720 A1 | 8/2013 | Ahluwalia et al. |
| 2013/0226751 A1 | 8/2013 | Friedholm et al. |

(56) References Cited

U.S. PATENT DOCUMENTS

| | | |
|---|---|---|
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246258 A1 | 9/2013 | Dessert |
| 2013/0246260 A1 | 9/2013 | Barten et al. |
| 2013/0246261 A1 | 9/2013 | Purves et al. |
| 2013/0246265 A1 | 9/2013 | Al-Sahli |
| 2013/0254028 A1 | 9/2013 | Salci |
| 2013/0254102 A1 | 9/2013 | Royyuru |
| 2013/0254114 A1 | 9/2013 | Smith |
| 2013/0254115 A1 | 9/2013 | Pasa et al. |
| 2013/0260734 A1 | 10/2013 | Jain et al. |
| 2013/0262309 A1 | 10/2013 | Gadotti |
| 2013/0262316 A1 | 10/2013 | Hruska |
| 2013/0262317 A1 | 10/2013 | Collinge et al. |
| 2013/0275250 A1 | 10/2013 | Rodell et al. |
| 2013/0290121 A1 | 10/2013 | Simakov et al. |
| 2013/0290169 A1 | 10/2013 | Bathula et al. |
| 2013/0290176 A1 | 10/2013 | Tirumalashetty |
| 2013/0297425 A1 | 11/2013 | Wallaja |
| 2013/0297486 A1 | 11/2013 | Colborn |
| 2013/0297513 A1 | 11/2013 | Kirillin et al. |
| 2013/0304559 A1 | 11/2013 | Stone et al. |
| 2013/0304642 A1 | 11/2013 | Campos |
| 2013/0317928 A1 | 11/2013 | Laracey |
| 2013/0332344 A1 | 12/2013 | Weber |
| 2013/0346302 A1 | 12/2013 | Purves et al. |
| 2014/0006129 A1 | 1/2014 | Heath |
| 2014/0006194 A1 | 1/2014 | Xie et al. |
| 2014/0006276 A1 | 1/2014 | Grigg et al. |
| 2014/0006277 A1 | 1/2014 | Rao |
| 2014/0012750 A1 | 1/2014 | Kuhn et al. |
| 2014/0019352 A1 | 1/2014 | Shrivastava |
| 2014/0019360 A1 | 1/2014 | Yang |
| 2014/0038546 A1 | 2/2014 | Neal et al. |
| 2014/0040139 A1 | 2/2014 | Brudnicki et al. |
| 2014/0052617 A1 | 2/2014 | Chawla et al. |
| 2014/0058855 A1 | 2/2014 | Hussein et al. |
| 2014/0058936 A1 | 2/2014 | Ren et al. |
| 2014/0058938 A1 | 2/2014 | McClung, III |
| 2014/0067677 A1 | 3/2014 | Ali et al. |
| 2014/0074581 A1 | 3/2014 | Johnson et al. |
| 2014/0074655 A1 | 3/2014 | Lim et al. |
| 2014/0074724 A1 | 3/2014 | Gordon et al. |
| 2014/0081783 A1 | 3/2014 | Paranjape et al. |
| 2014/0081854 A1 | 3/2014 | Sanchez et al. |
| 2014/0089171 A1 | 3/2014 | Gandhi |
| 2014/0089195 A1 | 3/2014 | Ward et al. |
| 2014/0096215 A1 | 4/2014 | Hessler |
| 2014/0100975 A1 | 4/2014 | Van |
| 2014/0101034 A1 | 4/2014 | Tanner et al. |
| 2014/0101048 A1 | 4/2014 | Gardiner et al. |
| 2014/0108254 A1 | 4/2014 | Lee |
| 2014/0109200 A1 | 4/2014 | Tootill et al. |
| 2014/0114856 A1 | 4/2014 | Jung et al. |
| 2014/0118704 A1 | 5/2014 | Duelli et al. |
| 2014/0122310 A1 | 5/2014 | Torrens et al. |
| 2014/0122563 A1 | 5/2014 | Singh et al. |
| 2014/0129357 A1 | 5/2014 | Goodwin |
| 2014/0129433 A1 | 5/2014 | Rosenberger |
| 2014/0136352 A1 | 5/2014 | Ramakrishna et al. |
| 2014/0143089 A1 | 5/2014 | Campos et al. |
| 2014/0188586 A1 | 7/2014 | Carpenter et al. |
| 2014/0188704 A1 | 7/2014 | Grossman et al. |
| 2014/0188718 A1 | 7/2014 | Grossman et al. |
| 2014/0188719 A1 | 7/2014 | Poornachandran et al. |
| 2014/0201086 A1 | 7/2014 | Gadotti et al. |
| 2014/0207680 A1 | 7/2014 | Rephlo |
| 2014/0210321 A1 | 7/2014 | Dixon |
| 2014/0214640 A1 | 7/2014 | Mallikarjunan et al. |
| 2014/0222670 A1 | 8/2014 | Concannon |
| 2014/0236792 A1 | 8/2014 | Pant et al. |
| 2014/0244506 A1 | 8/2014 | Gramling |
| 2014/0250003 A1 | 9/2014 | Levchin et al. |
| 2014/0258135 A1 | 9/2014 | Park et al. |
| 2014/0279097 A1 | 9/2014 | Alshobaki et al. |
| 2014/0279459 A1 | 9/2014 | Weiss et al. |
| 2014/0279469 A1 | 9/2014 | Mendes |
| 2014/0279559 A1 | 9/2014 | Smith et al. |
| 2014/0279566 A1 | 9/2014 | Verma et al. |
| 2014/0282068 A1 | 9/2014 | Levkovitz et al. |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0304187 A1 | 10/2014 | Menn |
| 2014/0310173 A1 | 10/2014 | Caldwell |
| 2014/0310182 A1 | 10/2014 | Cummins |
| 2014/0337175 A1 | 11/2014 | Katzin et al. |
| 2014/0337621 A1 | 11/2014 | Nakhimov |
| 2014/0344153 A1 | 11/2014 | Raj et al. |
| 2014/0351072 A1 | 11/2014 | Wieler et al. |
| 2014/0351126 A1 | 11/2014 | Priebatsch |
| 2014/0351130 A1 | 11/2014 | Cheek et al. |
| 2014/0365322 A1 | 12/2014 | Phillips |
| 2014/0365363 A1 | 12/2014 | Knudsen et al. |
| 2014/0376576 A1 | 12/2014 | Jespersen et al. |
| 2014/0379576 A1 | 12/2014 | Marx et al. |
| 2015/0019944 A1 | 1/2015 | Kalgi |
| 2015/0025464 A1 | 1/2015 | McTaggart et al. |
| 2015/0026049 A1 | 1/2015 | Theurer et al. |
| 2015/0032626 A1 | 1/2015 | Dill et al. |
| 2015/0032627 A1 | 1/2015 | Dill et al. |
| 2015/0046339 A1 | 2/2015 | Wong et al. |
| 2015/0066790 A1 | 3/2015 | Desanti |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0100442 A1 | 4/2015 | Van Heerden et al. |
| 2015/0100495 A1 | 4/2015 | Salama et al. |
| 2015/0112781 A1 | 4/2015 | Clark et al. |
| 2015/0120472 A1 | 4/2015 | Aabye et al. |
| 2015/0121063 A1 | 4/2015 | Maller et al. |
| 2015/0134514 A1 | 5/2015 | Chan et al. |
| 2015/0134540 A1 | 5/2015 | Law et al. |
| 2015/0137938 A1 | 5/2015 | Slaby et al. |
| 2015/0140960 A1 | 5/2015 | Powell et al. |
| 2015/0154588 A1 | 6/2015 | Purves et al. |
| 2015/0178693 A1 | 6/2015 | Solis |
| 2015/0186855 A1 | 7/2015 | Bennett et al. |
| 2015/0186872 A1 | 7/2015 | Sobol et al. |
| 2015/0186875 A1 | 7/2015 | Zhang et al. |
| 2015/0186886 A1 | 7/2015 | Schwalb et al. |
| 2015/0186952 A1 | 7/2015 | Brown et al. |
| 2015/0187021 A1 | 7/2015 | Moring et al. |
| 2015/0193131 A1 | 7/2015 | Bayer et al. |
| 2015/0193745 A1 | 7/2015 | Handwerger et al. |
| 2015/0193869 A1 | 7/2015 | Del Vecchio et al. |
| 2015/0213435 A1 | 7/2015 | Douglas et al. |
| 2015/0220914 A1 | 8/2015 | Purves et al. |
| 2015/0229622 A1 | 8/2015 | Grigg et al. |
| 2015/0237026 A1 | 8/2015 | Kumar |
| 2015/0242987 A1 | 8/2015 | Lee et al. |
| 2015/0254647 A1 | 9/2015 | Bondesen et al. |
| 2015/0254660 A1 | 9/2015 | Allison et al. |
| 2015/0254668 A1 | 9/2015 | Guiney et al. |
| 2015/0254698 A1 | 9/2015 | Bondesen et al. |
| 2015/0254699 A1 | 9/2015 | Bondesen et al. |
| 2015/0278799 A1 | 10/2015 | Palanisamy |
| 2015/0278816 A1 | 10/2015 | Fleishman et al. |
| 2015/0287015 A1 | 10/2015 | Kaplinger et al. |
| 2015/0287037 A1 | 10/2015 | Salmon et al. |
| 2015/0324768 A1 | 11/2015 | Filter et al. |
| 2015/0332252 A1 | 11/2015 | Shahrokhi et al. |
| 2015/0333964 A1 | 11/2015 | Wang et al. |
| 2015/0339662 A1 | 11/2015 | Huang et al. |
| 2015/0339663 A1 | 11/2015 | Lopreiato et al. |
| 2015/0339671 A1 | 11/2015 | Krietzman et al. |
| 2015/0348029 A1 | 12/2015 | Van Os et al. |
| 2015/0363810 A1 | 12/2015 | Kim et al. |
| 2015/0371212 A1 | 12/2015 | Giordano et al. |
| 2015/0371234 A1 | 12/2015 | Huang et al. |
| 2015/0371326 A1 | 12/2015 | Montesano et al. |

(56) References Cited

U.S. PATENT DOCUMENTS

| | | |
|---|---|---|
| 2016/0004876 A1 | 1/2016 | Bye et al. |
| 2016/0012465 A1 | 1/2016 | Sharp |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0048828 A1 | 2/2016 | Lee |
| 2016/0048929 A1 | 2/2016 | Parento et al. |
| 2016/0054336 A1 | 2/2016 | Anderberg et al. |
| 2016/0063496 A1 | 3/2016 | Royyuru et al. |
| 2016/0065370 A1 | 3/2016 | Le Saint et al. |
| 2016/0071071 A1 | 3/2016 | Lazay |
| 2016/0071074 A1 | 3/2016 | Baird |
| 2016/0071096 A1 | 3/2016 | Rosca |
| 2016/0071097 A1 | 3/2016 | Lazay |
| 2016/0071099 A1 | 3/2016 | Lazay |
| 2016/0071109 A1 | 3/2016 | Lazay |
| 2016/0071110 A1 | 3/2016 | Lazay |
| 2016/0086170 A1 | 3/2016 | Hurt et al. |
| 2016/0086179 A1 | 3/2016 | Barbier |
| 2016/0092696 A1 | 3/2016 | Guglani et al. |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0132884 A1 | 5/2016 | Fridman et al. |
| 2016/0140555 A1 | 5/2016 | Scipioni |
| 2016/0140561 A1 | 5/2016 | Cowan |
| 2016/0162882 A1 | 6/2016 | McClung, III |
| 2016/0162889 A1 | 6/2016 | Badenhorst |
| 2016/0180305 A1 | 6/2016 | Dresser et al. |
| 2016/0269416 A1 | 9/2016 | Camenisch et al. |
| 2016/0283925 A1 | 9/2016 | Lavu et al. |
| 2016/0342962 A1 | 11/2016 | Brown et al. |
| 2016/0342992 A1 | 11/2016 | Lee |
| 2016/0343043 A1 | 11/2016 | Hicks et al. |
| 2016/0379215 A1 | 12/2016 | Clerkin |
| 2017/0017958 A1 | 1/2017 | Scott et al. |
| 2017/0061402 A1 | 3/2017 | Mobin et al. |
| 2017/0061406 A1 | 3/2017 | Adams et al. |
| 2017/0061438 A1 | 3/2017 | Patel |
| 2017/0091758 A1 | 3/2017 | Kim et al. |
| 2017/0164139 A1 | 6/2017 | Deselaers et al. |
| 2017/0178110 A1 | 6/2017 | Swanson et al. |
| 2017/0185989 A1 | 6/2017 | Bozovich, Jr. |
| 2017/0193468 A1 | 7/2017 | Chougule et al. |
| 2017/0228715 A1 | 8/2017 | Gurunathan |
| 2017/0236118 A1 | 8/2017 | Laracey |
| 2017/0337542 A1 | 11/2017 | Kim et al. |
| 2017/0357969 A1 | 12/2017 | Huang et al. |
| 2017/0357977 A1 | 12/2017 | Pitz et al. |
| 2017/0364914 A1 | 12/2017 | Howard |
| 2018/0007052 A1 | 1/2018 | Quentin |
| 2018/0012203 A1 | 1/2018 | Hall |
| 2018/0032981 A1 | 2/2018 | Shanmugam et al. |
| 2018/0068308 A1 | 3/2018 | Gupta et al. |
| 2018/0082283 A1 | 3/2018 | Sharma |
| 2018/0096428 A1 | 4/2018 | Gorenstein |
| 2018/0157336 A1 | 6/2018 | Harris et al. |
| 2018/0219863 A1 | 8/2018 | Tran |
| 2018/0285836 A1 | 10/2018 | Enobakhare |
| 2018/0322488 A1 | 11/2018 | Arana et al. |
| 2018/0324204 A1 | 11/2018 | McClory et al. |
| 2018/0365675 A1 | 12/2018 | Sivaraman |
| 2018/0374076 A1 | 12/2018 | Wheeler |
| 2019/0108505 A1 | 4/2019 | Perlman |
| 2019/0122222 A1 | 4/2019 | Uechi |
| 2019/0165942 A1 | 5/2019 | Subramaniam |
| 2019/0220908 A1 | 7/2019 | Wilkes |
| 2019/0236577 A1 | 8/2019 | Schmid et al. |
| 2019/0280863 A1 | 9/2019 | Meyer et al. |
| 2019/0303803 A1 | 10/2019 | Buc et al. |
| 2019/0304029 A1 | 10/2019 | Murray et al. |
| 2019/0385250 A1 | 12/2019 | Bhattacharjee et al. |
| 2020/0005277 A1 | 1/2020 | Prabhu et al. |
| 2020/0028753 A1 | 1/2020 | Powar et al. |
| 2020/0034813 A1 | 1/2020 | Calinog et al. |
| 2020/0051117 A1 | 2/2020 | Mitchell |
| 2020/0076813 A1 | 3/2020 | Felice-Steele et al. |
| 2020/0097957 A1 | 3/2020 | Driggs et al. |
| 2020/0151706 A1 | 5/2020 | Mossoba et al. |
| 2020/0175496 A1 | 6/2020 | Finke et al. |
| 2020/0219060 A1 | 7/2020 | Fredericks et al. |
| 2020/0279305 A1 | 9/2020 | Mossoba et al. |
| 2020/0372536 A1 | 11/2020 | Scislowski et al. |
| 2021/0019718 A1 | 1/2021 | Moskowitz et al. |
| 2021/0027291 A1 | 1/2021 | Ranganathan |
| 2021/0056552 A1 | 2/2021 | Murray |
| 2021/0110392 A1 | 4/2021 | Lacoss-Arnold et al. |
| 2021/0158333 A1 | 5/2021 | Cohen et al. |
| 2021/0166260 A1 | 6/2021 | Ho et al. |
| 2021/0358754 A1 | 11/2021 | Masuoka et al. |
| 2021/0398179 A1 | 12/2021 | Kolaja et al. |
| 2022/0027873 A1 | 1/2022 | Pathuri et al. |
| 2022/0101609 A1 | 3/2022 | Hu et al. |
| 2022/0147967 A1 | 5/2022 | Clark |
| 2022/0210209 A1 | 6/2022 | Vanbuskirk et al. |
| 2022/0215356 A1 | 7/2022 | Dakshinyam et al. |
| 2022/0343380 A1 | 10/2022 | Abhyankar et al. |

FOREIGN PATENT DOCUMENTS

| | | |
|---|---|---|
| WO | WO-2011/100529 A1 | 8/2011 |
| WO | WO-2011/113121 A1 | 9/2011 |
| WO | WO-2011/159842 A2 | 12/2011 |
| WO | WO-2012/139003 A2 | 10/2012 |
| WO | WO-2013/044175 A1 | 3/2013 |
| WO | WO-2013/079793 A1 | 6/2013 |
| WO | WO-2014/111888 A1 | 7/2014 |
| WO | WO-2014/134180 A2 | 9/2014 |
| WO | WO-2014/207615 A1 | 12/2014 |
| WO | WO-2014/210321 A2 | 12/2014 |
| WO | WO-2015/023172 A2 | 2/2015 |
| WO | WO-2015/054697 A1 | 4/2015 |
| WO | WO-2016/009198 A1 | 1/2016 |
| WO | WO-2016/053975 A1 | 4/2016 |
| WO | WO-2016/097879 A1 | 6/2016 |
| WO | WO-2016/153977 A1 | 9/2016 |
| WO | WO-2016/172107 A1 | 10/2016 |
| WO | WO-2016/196054 A1 | 12/2016 |
| WO | WO-2017/106309 A1 | 6/2017 |
| WO | WO-2018/005798 A1 | 1/2018 |

OTHER PUBLICATIONS

Authors et al: Tianliang Lei ; Title: Investigation of Cross-Social Network User Identification; Date of Conference: Apr. 21-22, 2022. (Year: 2022).

Authors: Saygin Baksi et al; Title: Optimal primary-secondary user pairing and power allocation in cognitive cooperative multiple access channels; Date Added to IEEE Xplore: Apr. 10, 2014 (Year: 2014).

Hany Herb, Hassan Farahat, and Mohamed Ezz, SecureSMSPay: Secure SMS Mobile Payment Model, 2008, 2008 2nd International Conference on Anti-counterfeiting, Security and Identification (pp. 11-17) (Year:2008).

J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MU E.2009.62. (Year: 2009).

Latterell, Kayla, "How Do Gift Cards Work?," https://www.cardsource.com/news/how-do-gift-cards-work, pp. 1-6.

P2P-Paid: A Peer-to-Peer Wireless Payment System by Gao et al (Year: 2005).

"Authors et al., Secure Authorization Token, Sep. 18, 2013, IP.com PAD, entire document" (Year: 2013).

Kyrillidis; Mayes; Markantonakis, Card-present Transactions on the Internet Using the Smart CardWeb Server, 2013, IEEE, 12th, p. 616 (Year: 2013).

(56) References Cited

OTHER PUBLICATIONS

Urien, P., et al., "A breakthrough for prepaid payment: End to end token exchange and management using secure SSL channels created by EAP-TLS smart cards", 2011 International Conference on Collaboration Technologies and Systems (CTS), 2011. (Year: 2011).
"Cashcloud Mobile eWallet", FinTech Forum Exchange, Jul. 1, 2016. 4 pages.
"Cashcloud mobile eWallet", Popote Payments, www.popotepayments. com, 2016. 6 pages.
"Messages in the SCT interbank space—pacs.008 and pacs.002", Nov. 1, 2017, Paiementor, pp. 1-3 (Year: 2017).
A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).
Alipay, Alipay Documentation Red Packet QR Code Introduction, printed on Sep. 30, 2019 at Internet address https://intl.alipay.com/doc/redpacket/scrzsv, 2 pages.
Alipay, Trust Makes It Simple, printed on Sep. 30, 2019 from Internet address https://intl.alipay.com/, 3 pages.
Authors et al.: Disclosed anonymously, Notifying a User When a Bill Is Due Using a Notification on the User's Mobile Device, Oct. 18, 2013 IP.com PAD, entire document (Year: 2013).
Bravo, Bravo Pay, CrunchBase, printed on Sep. 30, 2019 from Internet address https://www.crunchbase.com/organization/bravo#section-overview, 9 pages.
Bravo, Tip or Pay Your Tour Guide Without Sharing Personal Info, printed on Sep. 30, 2019 from Internet address https://trybravo.com, 4 pages.
Bravo, Trybravo's Competitors, Revenue, Number of Employees, Funding and Acquisitions, printed from Internet address https://www.owler.com/company/trybravo on Sep. 30, 2019, 2 pages.
DipJar, printed on Sep. 30, 2019 from Internet address https://www.dipjar.com/, 10 pages.
EMV, "Payment Tokenisation Specification Technical Framework", 2014 EMVCO, LLC. 84 pages.
Examiner's Answer issued in U.S. Appl. No. 15/401,664 dated Sep. 23, 2021.
How to Control Children's Spending on Debit Cards | Money | by Jill Paperworth, May 10, 2009, https:www.theguardian.com/money/2009/mar/... /children-debit-cards-online-spend . . . (Year: 2009).
Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.
LevelUp, Restaurant Customers Expect Seamless Digital Experiences, printed on Sep. 30, 2019 from Internet address https://www.thelevelup.com/, 4 pages.
Message in the SCT interbank space—pacs.008 and pacs.002, Nov. 1, 2017, Paiementor, pp. 1-3 (Year: 2017).
N. C. Kiran and G. N. Kumar, "Reliable OSPM schema for secure transaction using mobile agent in micropayment system," 2013 Fourth International Conference on Computing, Communications and Networking Technologies (ICCCNT), 2013, pp. 1-6, doi: 10.1109/ICCCNT.2013,6726503. (Year: 2013).
P. De, K. Dey, V. Mankar and S. Mukherjea, "Towards an interoperable mobile wallet service," 2013 10th International Conference and Expo on Emerging Technologies for a Smarter World (CEWIT), 2013, pp. 1-6, doi: 1109/CEWIT.2013.6713767. (Year: 2013).
Smart Card Alliance, "The Mobile Payments and NFC Landscape: A U.S. Perspective," Sep. 2011. 53 pages.
Square, Inc., Grow Your Business Your Way With Square Tools, printed on Sep. 30, 2019 from Internet address https://squareup.com/us/en, 8 pages.
TSIP, Introducing Helping Heart—A Contactless Payment Jacket to Help the Homeless, dated Jul. 4, 2017, printed on Sep. 30, 2019 from Internet address https://www.tsip.co.uk/blog/2019/2/19/introducing-helping-heart-a-contactless-payment-jacket-to-help-the-homeless, 4 pages.
Uber, How Uber Works, printed on Sep. 30, 2019 from Internet address https://www.uber.com/us/en/about/how-does-uber-work/, 6 pages.
W. Adi, A. Al-Qayedi, A. A. Zarooni and A. Mabrouk, "Secured multi-identity mobile infrastructure and offline mobile-assisted micropayment application," 2004 IEEE Wireless Communications and Networking Conference (IEEE Cat. No. 04TH8733), 2004, pp. 879-882 vol. 2, doi: 10.1109/WCNC.2004.1311302. (Year: 2004).
Wazeopedia, Main Page, printed on Sep. 30, 2019 from Internet address https://wazeopedia.waze.com/wiki/USA/Main_Page, 3 pages.
White, Ron, "How Computers Work", Que Publishing, 7th Ed, Oct. 15, 2003, p. 4. 23 pages.
Yang, Ming-Hour. "Security enhanced EMV-based mobile payment protocol." TheScientificWorldJournal vol. 2014 (2014): 864571. Doi: 10.115/2014/864571 (Year: 2014).
Polito et al., Inter-provider AAA and Billing of VoIP Users with Token-based Method, Dec. 26, 2007, IEEE Xplore, entire document (Year: 2007).
Paiementor., "Messages in the SCT interbank space—pacs. 008 and pacs.002," Nov. 1, 2017, Paiementor, pp. 1-3 (Year 2017).

* cited by examiner

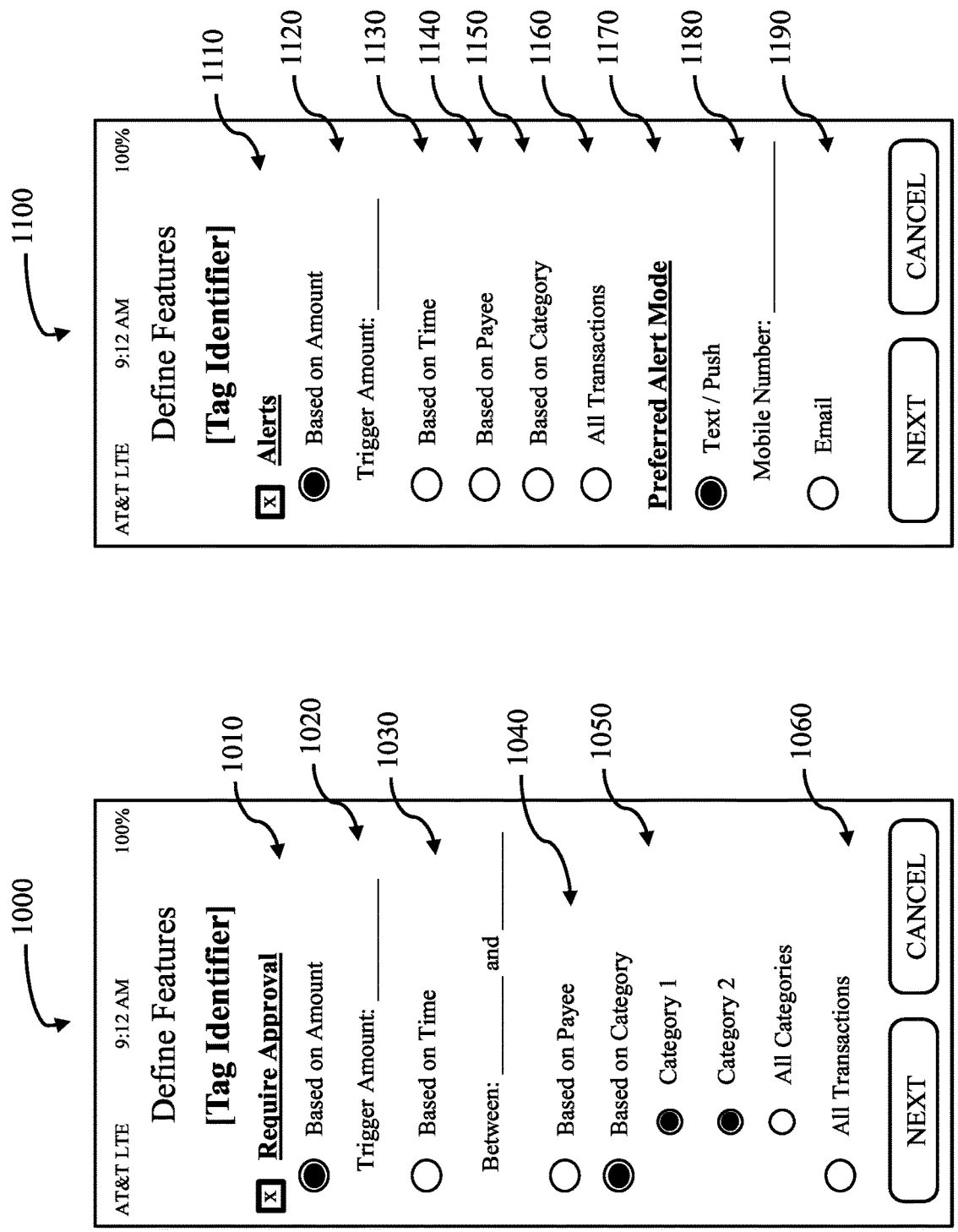

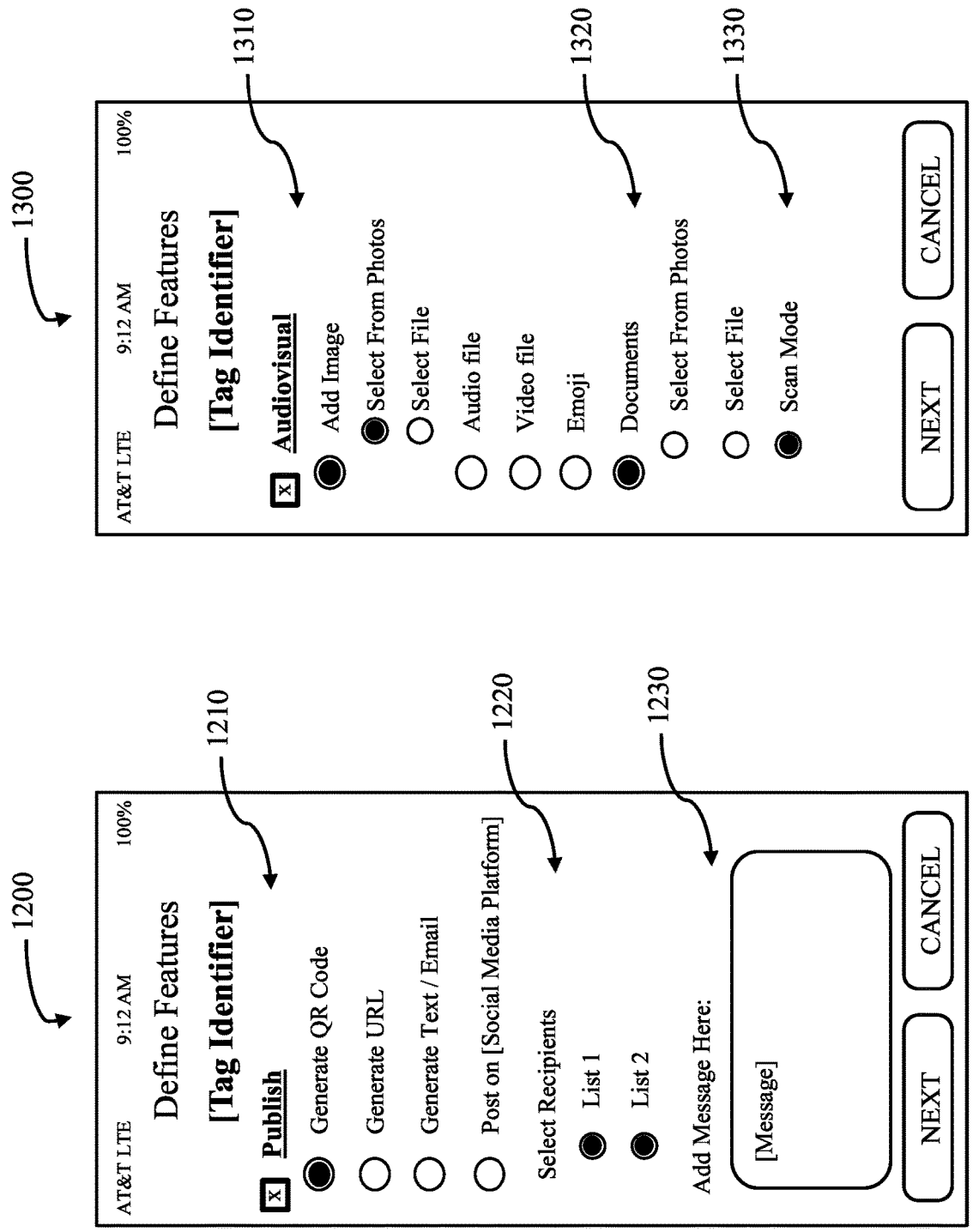

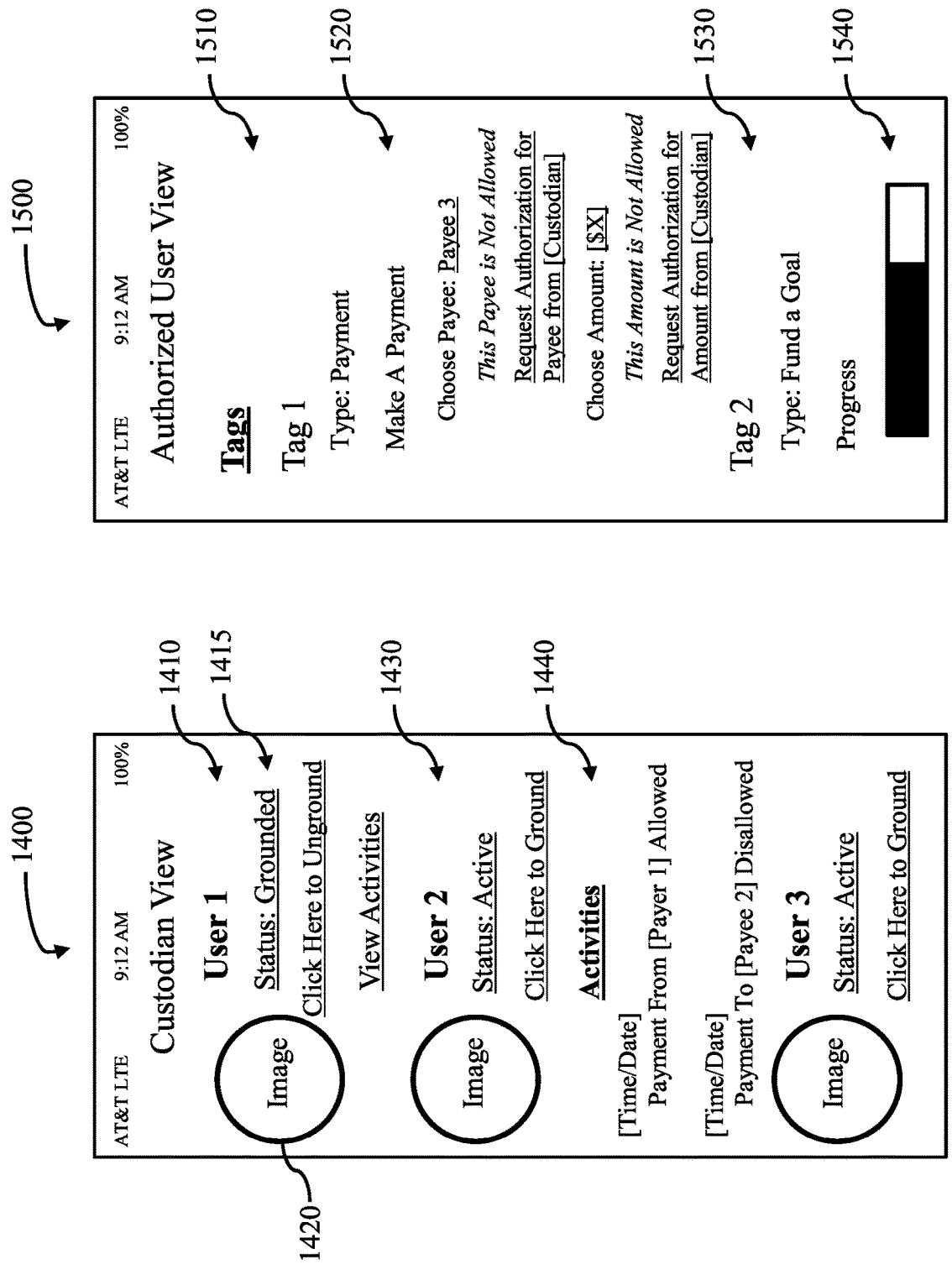

MULTI-MODAL PARAMETERIZATION OF DIGITAL TOKENS INVOLVING MULTIPLE ENTITIES IN DEFINED NETWORKS

CROSS-REFERENCE TO RELATED APPLICATIONS

This application claims priority to U.S. Provisional Patent Application No. 63/234,091 filed Aug. 17, 2021, which is incorporated herein by reference in its entirety.

BACKGROUND

Users can register to engage in transactions (such as funds transfers or payments) through a digital payments platform. Registration with the digital payments platform identifies an account that is a source of funds, and once registered, the user can identify other registered users to receive specified funds. These two-party transactions are completed with involvement only by a first user initiating the transaction and a second user that is a recipient.

SUMMARY OF THE INVENTION

Various embodiments of the disclosure relate to a computer-implemented method, computing system, and/or computing device. The approach may comprise receiving, from a first computing device of a first user of a digital payment platform, a request for a unique tag having a set of features, wherein the set of features identifies a second user and a restriction on transactions initiated by the second user; generating, by a processor of a computing system, a unique digital token based on the unique tag; parameterizing, by the processor, the digital token by assigning a set of parameters to the digital token based on the set of features; receiving, from a second computing device of the second user or a third computing device of a third user, by the processor, a transaction request for a funds transfer or a payment to be made through a payment network, the transaction request identifying or including at least one of the unique tag or the digital token; and applying, by the processor, the restriction to the funds transfer or the payment based on the set of parameters of the digital token.

In one aspect, various embodiments relate to a computer-implemented method, comprising: receiving, from a first computing device of a first user of a digital payment platform, a request for a unique tag having a set of features, wherein the set of features identifies a second user and a restriction on transactions initiated by the second user; generating, by a processor of a computing system, a unique digital token based on the unique tag; parameterizing, by the processor, the digital token by assigning a set of parameters to the digital token based on the set of features; receiving, from a second computing device of the second user or a third computing device of a third user, by the processor, a transaction request for a funds transfer or a payment to be made through a payment network, the transaction request identifying or including at least one of the unique tag or the digital token; and applying, by the processor, the restriction to the funds transfer or the payment based on the set of parameters of the digital token.

In various embodiments, the unique digital token is multi-modal. In various embodiments, the set of parameters imposes a mode to the digital token. In various embodiments, the mode is a first mode enabling one or more funds transfers or payments using the digital token. In various embodiments, the first mode corresponds to automated transfers transmitted to one or more identified computing systems. In various embodiments, the mode is a second mode enabling importation of data or documents in association with the unique tag. In various embodiments, imported data or documents are routed to an identified digital location.

In various embodiments, the restriction imposes heightened security requirements for the funds transfer or the payment.

In various embodiments, the digital token identifies or includes the set of parameters.

In various embodiments, the digital token identifies or includes one or more digital locations via which the set of parameters is accessible. In various embodiments, the digital token identifies or includes one or more security measures required for access to the set of parameters at the digital locations.

In various embodiments, the set of parameters triggers an alert to one or more computing devices of one or more identified users.

In various embodiments, the set of parameters triggers a requirement for authorization by one or more identified users before proceeding with the funds transfer or the payment.

In various embodiments, the method may comprise publishing the unique tag to one or more computing devices of one or more users. In various embodiments, publishing the unique tag comprises generating a unique code and transmitting the unique code to the one or more computing devices. In various embodiments, the unique code is a QR code.

In various embodiments, applying the restriction comprises transmitting a request for authorization to a fourth computing device of a fourth user. In various embodiments, applying the restriction comprises refusing the funds transfer or the payment in response to not receiving authorization from a fourth computing within a predetermined time (e.g., 30 seconds, a minute, 5 minutes, 15 minutes, 30 minutes, 1 hour, 2 hours, 12 hours, 24 hours, 1 week, 1 month, 90 days, 1 quarter, or otherwise) following transmission of the request. In various embodiments, applying the restriction comprises approving the funds transfer or the payment in response to receiving authorization from the fourth computing following transmission of the request.

In various embodiments, applying the restriction comprises refusing the funds transfer or the payment based on a recipient of the funds transfer or the payment.

In various embodiments, the payment network is the digital payment platform.

In another aspect, various embodiments relate to a computing system having one or more processors configured to: receive, from a first computing device of a first user of a digital payment platform, a request for a unique tag having a set of features, wherein the set of features identifies a second user and a restriction on transactions initiated by the second user; generating a unique digital token based on the unique tag; parameterizing the digital token by assigning a set of parameters to the digital token based on the set of features; receiving, from a second computing device of the second user or a third computing device of a third user, a transaction request for a funds transfer or a payment to be made through a payment network, the transaction request identifying or including at least one of the unique tag or the digital token; and applying the restriction to the funds transfer or the payment based on the set of parameters of the digital token.

In yet another aspect, various embodiments relate to a non-transitory computer-readable storage medium comprising instructions configured to cause a computing system, when executing the instructions using one or more processors, to: receive, from a first computing device of a first user of a digital payment platform, a request for a unique tag having a set of features, wherein the set of features identifies a second user and a restriction on transactions initiated by the second user; generating a unique digital token based on the unique tag; parameterizing the digital token by assigning a set of parameters to the digital token based on the set of features; receiving, from a second computing device of the second user or a third computing device of a third user, a transaction request for a funds transfer or a payment to be made through a payment network, the transaction request identifying or including at least one of the unique tag or the digital token; and applying the restriction to the funds transfer or the payment based on the set of parameters of the digital token.

These and other features, together with the organization and manner of operation thereof, will become apparent from the following detailed description and the accompanying drawings.

BRIEF DESCRIPTION OF THE DRAWINGS

FIGS. 4-17 depict example graphical user interfaces depicting various functionality in accordance with various potential embodiments.

DETAILED DESCRIPTION

Figure 1:
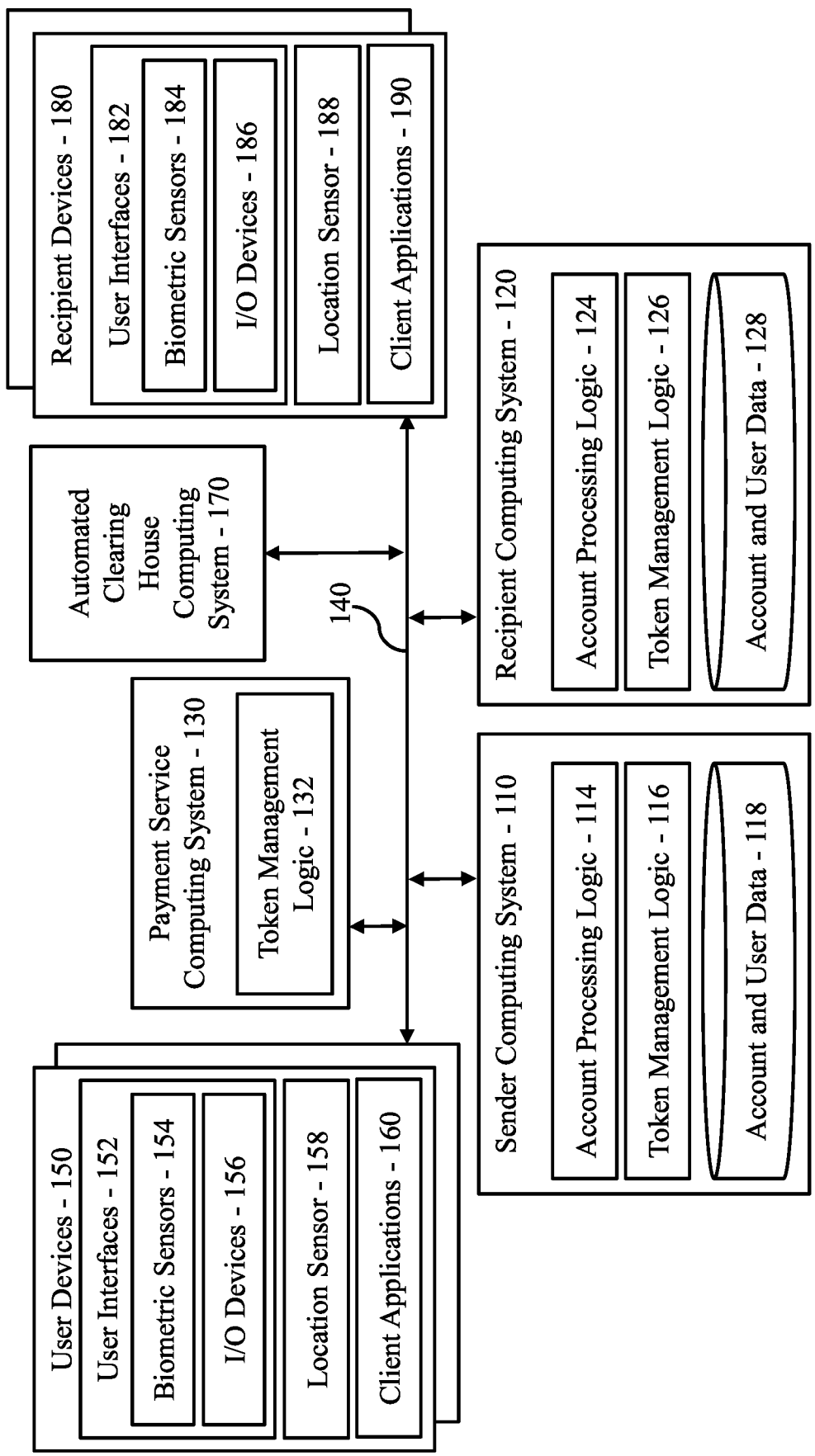
FIG. 1 is a block diagram of an illustrative example system enabling a fund transfer system employing unique tags in accordance with various potential embodiments.

Various embodiments described herein relate to systems, methods, and devices for generating and parameterizing digital tokens to effectuate various functions involving multiple entities in a defined network. A user may begin by selecting or defining a unique tag and its associated features, and a token is generated with parameters corresponding to the features. The generated token pertains to one or more specific identified users and one or more specific identified accounts. The features and corresponding parameters may be associated with, for example: restrictions on digital transactions; approval and/or review requirements for identified users; approval and/or review requirements for specific payments and/or funds transfers; alerting for users and/or devices; manners of publication or proliferation; incorporation of sounds and imagery in alerts and/or publications; narratives identifying particular features, goals, purposes, and/or affected users; status, such as enabled, enabled until a condition is satisfied, disabled, or disabled until a condition is satisfied, with conditions defined as, for example, passage of certain time or detection of a particular event such as meeting a goal or performing an action; security protocols and requirements with various stringency; and/or steps to be taken in an automated fashion at specified times and/or with specific periodicity. The tokens are multi-modal, allowing for the token to be employed in, for example, a payment mode, an automated funds transfer mode, or a data and/or documentation importation mode that allows a user to import specific information (by, e.g., scanning documents or accessing various databases or other data sources). The digital tokens may embed various features or parameters, may include one or more digital network addresses or other digital locations for various parameters or resources (where features or parameters are located and may be accessed), and/or may include codes or other security measures for authentication and/or validation. In various embodiments, a digital token may be associated with multiple users, with certain users having various permissions, restrictions, approval requirements, alerting protocols, and other features.

Advantageously, embodiments of the disclosed approach do not require a financial account to be established for users linked to a unique tag. Existing accounts at different financial institutions can be linked to a unique tag, and the defined features (and corresponding digital token parameters) are features of the unique tag, with no changes to any particular financial account being needed. Parameters can thus be applied to a variety of accounts, without needing to make changes to the those accounts or how they are administered by the institutions holding those accounts. In various embodiments, unique tags are generated and used through a digital payments network (such as "Zelle," "PayPal," "Venmo," "Cash App," "Google Pay," or "Apple Pay") or other payment platform, rather than through particular accounts or financial institutions.

Also advantageously, embodiments of the disclosed approach enable "custodians" (e.g., parents) to allow authorized users (e.g., one or more children) to use a digital payments network (such as "Zelle") with their own accounts or accounts of others. A bank or credit card account need not be opened in the name of the child, nor does the child need to be added to a parent's account. The disclosed approach enables "family" (or other defined network) accounts attached to unique tags that can span a variety of funding sources, without being limited to any particular bank account or bank, and without needing to make changes to individual accounts.

In various embodiments, features can be defined that allow for parental review and/or approval or authorization of payees and/or payments. The system allows for, for example, parental or other user alerts on funds transfers, payments, or receipt of funds. For example, a parent can receive a text message, email, and/or a push notification when a child uses (or attempts to use) an account linked to a unique tag for a payment or other fund transfer. In various embodiments, integration with a platform (e.g., "Pay with Zelle") enables category controls/approvals, limits by category, limits by amounts, and limits by location. For example, a parent can limit or block spending on certain categories, such as gaming, fast food, gambling, etc.

In various embodiments, a unique tag may be created and published to friends and family as "funds" for gifting (e.g., for a birthday, graduation, etc.), as a sort of individualized funding campaign. A published tag, because it is unique to payment platforms, enables others to make digital funds transfers through the payment platforms without the need to share any account information. A QR ("quick response") code, a barcode, or other unique code readable by a code reader device (e.g., a QR code reader or a barcode reader), a URL, or other unique identifier may also be shared to enable others to make digital transfers for particular purposes. For example, different unique tags may be created for a college fund, a vehicle fund, a vacation fund, a school trip, a religious mission, a charity drive, etc. In various embodiments, the system provides different views for different users associated with the unique tag. For example, a "child" view may show basics of income, outflow, savings, money growth, etc., with various audiovisual effects intended to entertain and motivate the child (e.g., alerts with emoji, gifs, artwork, sounds, etc.). Unique tags may be established for goals, and rewards established to motivate the child to achieving the goal (e.g., matching funds by parents, gift certificates, approval for specific purchases, etc.). By contrast, a parental view may show the whole family and activities of the members. The parental view may provide information on financial health (based on, e.g., savings, timeliness of debt payments, etc.), and may be an integrated source for tracking spending by the family.

In various embodiments, unique tags may be generated for automated savings ("auto save") or automated investment ("auto invest"), such as Uniform Transfers to Minors Act (UTMA) and/or Universal Gift To Minor (UGMA) transfers, or other savings mechanisms such as qualified tuition plans ("529 plans"). Unique tags (or associated QR codes, URLs, etc.) may be generated to enable gifting or otherwise transferring of stocks. In various embodiments, audiovisual resources can be used for advertising that integrates a QR code or unique tag. For example, paper flyers or business cards for various services (e.g., grass cutting, babysitting, dog walking, house sitting, plant watering, etc.) can include a QR code that includes certain artwork. Custom emails and/or social media posts may be transmitted to promote or inform others of various services, goals, etc.

In various embodiments, the system may provide a "grounding" that allows a parent to enable or otherwise activate a set of limitations by category, time period, etc. (e.g., a predefined set of restrictions based on spending category, recipient, time frame, etc.), or to shut off or otherwise deactivate all spending, potentially with allowances or exceptions for emergency and/or other specific use.

In various embodiments, the system allows for private and secure family folders that are integrated with a unique tag and/or QR code. A user may be able to scan and/or import various documents and files, such as vaccination cards, standardized test scores, report cards, private medical information (e.g., prescription medicines, eyeglass prescriptions, laboratory test results, etc.), and subsequently privately and securely share specific documents or data that are scanned and/or imported (e.g., a subset of documents or data based on particular definitions, such as "prescriptions," "grades," etc.).

Referring to FIG. 1, a fund transfer and token management system 100 that implements multi-modal digital tokens for payments or other funds transfers is shown, according to various potential embodiments. The system 100 may be utilized by senders to send funds to recipients, by recipients to receive the funds, and by intermediaries who may apply restrictions or require approval before funds may be transferred. The system 100 may facilitate the transfer of funds from senders to receivers without either party sharing information about their financial accounts with each other. The senders and recipients may be individuals, groups of individuals, or organizations. In certain embodiments, a sender may use a bank account as a source of funds. In other embodiments, the sender may use credit cards, debit cards, business credit cards or check cards as the source of funds. The system 100 may be used for both intrabank transfers (i.e., transfers in which the sender and the recipient both have accounts at the same bank and the funds are transferred between the accounts within the same bank) and interbank transfers (i.e., transfers in which the sender and the recipient have accounts at different banks and the funds are transferred between the accounts at different banks).

The system 100 may include, among other systems, a sender computing system 110, a recipient computing system 120, a payment service computing system 130 of a service provider, user devices 150 of users initiating, approving, or otherwise involved with unique tags (e.g., custodians, authorized users, benefactors, etc.), an automated clearing house computing system 170, and recipient computing systems 180 associated with third-party recipients of funds and payments (other than users involved with the unique tags). Each of the above described systems may communicate through a telecommunications network 140, which may include one or more of the Internet, Cellular network, Wi-Fi, Wi-Max, a proprietary banking network, and so on. Each system and device in system 100 may include, for communicating via network 140, a network interface device and network interface logic that may include, for example, program logic that connects the system or device to the network 140 or to other systems and devices. The network interface logic may facilitate secure communications between the bank and the sender and/or the recipient. The network interface logic may also facilitate communication with other entities, such as other banks, settlement systems, and so on. The network interface logic may include user interface program logic configured to communicate with client applications running on other computing systems and devices, and generate and present web pages to users accessing a computing system over the network 140.

In FIG. 1 and other parts of the description, for sake of discussing example embodiments, it may be assumed that the sender performs a funds transfer from an account maintained by the sender computing system 110 and the receiver receives the funds using an account maintained by the recipient computing system 120. Hence, the computing system 120 may be associated with a sender bank computing system and the recipient computing system 120 may be associated with a receiver bank computing system. It will be appreciated of course that any given bank computer system may operate in different capacities in the context of different fund transfer transactions. Additionally, while examples provided herein may be in the context of a sender requesting a funds transfer to a recipient, it will also be appreciated that a recipient may request a funds transfer from a sender.

The user devices 150 may be used by individual users (e.g., a business owner or employee, a consumer, and so on) to initiate or request transactions and interact with banking functions provided through an online banking application or other client application, an online banking area of a website provided by the sender computing system 110, or through an a client application or website provided by the payment service computing system 130. The user devices 150, for example, may be or may comprise personal computers (e.g., desktops or laptop computers), smartphones, tablet computers, wearable devices such as smartwatches, smart assistants/smart speakers, a personal digital assistant, a portable gaming device, or other suitable device. In some embodiments, the user devices 150 may be part of, or may be replaced by, one or more servers, each with one or more processors configured to execute instructions stored in memory. For example, such an arrangement may be utilized if the sender initiating a funds transfer or payment is a merchant such as an online retailer or another organization.

User devices 150 may include one or more user interfaces 152, which may include one or more biometric sensors 154 (such as a fingerprint reader, a heart monitor that detects cardiovascular signals, an iris scanner, etc.). User interfaces 152 may also include input/output ("I/O") devices 156 that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the user to provide inputs (such as a touchscreen display, stylus, keyboard, force sensor for sensing pressure on a display screen, etc.). User devices 150 may include one or more location sensors 158 to enable the user device 150 to determine its location relative to, for example, other physical objects or relative to geographic locations. Example location sensors 158 include global positioning system (GPS) devices and other navigation and geolocation devices, digital compasses, gyroscopes and other orientation sensors, as well as proximity sensors or other sensors that allow the user device 150 to detect the presence and relative distance of nearby objects and devices. The user devices 150 may store in computer memory, and execute ("run") using one or more processors, client applications 160, such as an Internet browser presenting websites, a banking application, an application of a payment platform, and applications provided or authorized by the entity implementing or administering any of the computing systems in system 100. Example client applications may present the user interfaces presented in the figures.

Similarly, recipient systems 180 (which may be, or may comprise, one or more computing devices) may include one or more user interfaces 182, which may include one or more biometric sensors 184. User interfaces 182 may also include input/output components 186 that provide perceptible outputs, that capture ambient sights and sounds, and/or that allow the user to provide inputs. Recipient systems 180 may include one or more location sensors 188 to enable the recipient system 180 to determine its location relative to, for example, other physical objects or relative to geographic locations. The recipient systems 180 may store in computer memory, and execute ("run") using one or more processors, various client applications 190.

The user devices 150 and recipient systems 180 may receive and display screens on the I/O devices 156, 186 including account information, transaction instructions, and so on. In an example embodiment, such screens may be used to request a username and password information. Such screens may also be used to prompt the user to provide information regarding the amount of the funds and the identity of the merchant or individual that is to receive the funds. Such information may comprise, for example, a unique tag as described herein, a name, an address, a phone number, an e-mail address, a selection of a recipient from an electronic directory, and/or other information. Such screens may also include screens displaying information regarding past transactions. The input device 116 may be used to permit the user to initiate account access and to facilitate receiving fund transfer request information from the user.

The client applications 160 and/or 190 may comprise program logic (i.e., stored executable instructions) configured to implement at least some of the functions described herein. As will be appreciated, the level of functionality that resides on the user devices 150 and recipient systems 180 as compared to other components of the system 100 may vary depending on the implementation. The client application 160 and/or 190 may be a web browser (e.g., "Internet Explorer," "Mozilla Firefox," "Chrome," "Safari," and so on) configured to receive and display web pages received from another component of system 100. The client application may also comprise a mobile web browser, text message (SMS) interface, a dedicated application, or other program suitable for sending and receiving information over the network 140.

The sender computing system 110 may be operated by a bank or other financial institution that maintains accounts held by customers, such as demand deposit accounts, credit card accounts, home mortgage loans, student loans, and so on. The sender computing system 110 may, for example, comprise one or more servers each with one or more processors configured to execute instructions stored in memory, send and receive data stored in memory, and perform other operations to implement the operations described herein associated with logic or processes shown in the figures.

The sender computing system 110 may include network interface logic, account processing logic 114, token management logic 116, and account and user data 118 (in one or more databases. The network interface logic may include, for example, program logic that connects the sender computing system 110 to the network 140. The network interface logic may facilitate secure communications between the bank and the sender and/or the recipient. The network interface logic may also facilitate communication with other entities, such as other banks, settlement systems, and so on. The network interface logic may include user interface program logic configured to generate and present web pages to users accessing the sender computing system 110 over the network 140.

The account processing logic 114 may perform account processing to process transactions in connection with the account(s) of the account holder, such as account credits and debits to checking and savings accounts, credits and debits to home mortgage and home equity accounts, credits and debits to student loan accounts, and so on. Thus, whenever funds are transferred into or out of an account of an account holder (e.g., a sender or recipient of funds), the account processing logic 114 reflects an appropriate debit or credit in the account and user data 118, which stores account information (e.g., transactions, information about the account holder, and so on) for accounts that are maintained by the bank on behalf of its customers. The account processing logic 114 may also process fund transfer requests to transfer funds from a sender using the user devices 150 to a recipient using the recipient computing system 180.

The account and user data 118 may be used when an identifier other than a bank account/routing number is used (e.g. an e-mail address, phone number, Universal Payment Identification Code (UPIC), randomly generated number, and so on) to identify a recipient of a funds transfer. The account and user data 118 may be a database that is maintained to allow the financial institution to convert/correlate the recipient's cell phone number (or e-mail address, unique tag, or other identifier) to a bank account number/routing number of the recipient's bank account. This arrangement allows the sender to uniquely identify the recipient based on the unique tag or other identifier, without necessarily having private/personal information regarding the recipient (e.g., a recipient's bank account/routing number). Users may register and be added to the account and user data 118 prior to any financial transaction. Upon registration, a new entry may be created for the newly registered user in a database that implements the account and user data 118. The user may provide one or more identifiers (e.g., unique tags, phone numbers, e-mail addresses, and so on) that the user may share with other individuals with whom the user interacts (for example, in the same way that people selectively or freely share phone numbers and e-mail addresses with other individuals for purposes of communicating with such other individuals). Herein, such identifiers are referred to as "public tags" or "public tokens." The sender computing system 110 may also generate or otherwise associate an identifier that is securely maintained and that is used to identify the user in the account and user data 118. Herein, such identifiers are referred to as "private identifiers." The private identifier may, for example, be a unique ID of the database entry for the user in the account and user data 118, and need not be known by the user with whom it is associated or by other users. In some embodiments, digital tokens comprising or corresponding to public identifiers (e.g., unique tags) and/or private identifiers may be generated.

Additionally, the account and user data 118 may, for each user, also store a registry of other users connected to that user. That is, for each user, a registry may be stored that includes a listing of each other user with whom the user has an established connection. Such connection may be established, for example, the first time that the user sends or receives funds from the other user, or when a tag is established or generated. A connection may also be established by way of a user interface that permits a user to add connections with other users through a lookup service. An example of such a user interface is discussed below in connection with the figures. For each user in the registry, additional information may be stored, such as their unique ID and/or other information.

The token management logic 116 may be used to manage tokens. For example, the token management logic 118 may be configured to register tokens, authenticate tokens, generate tokens and so on. The token management logic 116 may also facilitate identification of the recipient when a token is not recognized. The token management logic 116 may also be used to customize attributes of tokens or otherwise parameterize, such that particular accounts are used, particular methods of notification are used, and so on. Token management logic is discussed in greater detail below in connection with FIG. 2.

The recipient computing system 120 may be configured in a similar manner as the sender computing system 110, with account processing logic 124, token management logic 126, and account and user data 128.

The payment service computing system 130 may be associated with a payment service that is configured to serve as a digital payments network or digital payments platform that facilitates interbank fund transfers, e.g., a payment service provided by a non-bank entity as previously mentioned. The payment service may, for example, be an entity that is formed as a joint venture between banks and/or other entities that send and receive funds using the fund transfer system 100. As another example, the payment service may be a third party vendor. As another example, the payment service may be a web portal provided for an online community of individuals where such individuals obtain user names/login IDs or otherwise become registered members. As another example, the payment service may be provided by one of the banks, i.e., such that the bank performs both the operations described herein as being performed by the computing system 110/120 and the operations described herein as being performed by the payment service computer system 130. The payment service computing system 130 may, in various embodiments, provide (e.g., through its own client application or through integration with a client application of another entity, such as a banking application) at least some of the functionality depicted in the figures and discussed below. Some of that functionality may be provided via token management logic 132, further discussed below.

Herein, banks associated with computing systems 110 and 120 may be "member banks" that are assumed to follow established protocols for transferring funds using system 100 for fund transfers. For example, in the context of a payment service that is created as a joint venture, the member banks may include at least the banks that are part owners of the joint venture, as well as potentially other banks. While two member banks are shown in FIG. 1, it will be appreciated that there may be additional member banks. Additionally, as previously indicated, non-bank entities may also be members. The payment service may also be used by senders and recipients that have bank accounts at non-member banks, for example, by permitting such users to register directly with the payment service computer system 160. Hence, users do not need to be customers of any particular bank in order to be able to transfer funds via system 100.

In potential embodiments, payment service computing system 130 may, for example, comprise one or more servers each with one or more processors configured to execute instructions stored in memory, send and receive data stored in memory, and perform other operations to implement the operations described herein associated with certain logic or processes depicted in the figures. Although not specifically shown, it will be appreciated that the payment service computer system 130 may include network interface logic, various databases, account processing logic, and other logic in the same or similar manner to the other components of system 100. The network interface logic may include user interface program logic configured to generate and present web pages or other data to users accessing the payment service computing system 130 over the network 140.

An Automatic Clearing House (ACH) system 170 may be used to transmit funds to and from bank accounts of the senders and recipients. As is known, the ACH Network is a nationwide batch oriented electronic funds transfer system which provides for interbank clearing of electronic payments for participating depository financial institutions. An ACH entry may start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it is debit or credit) towards an account without prior authorization from the Receiver. Once authorization is received, the Originator then creates an ACH entry to be given to an Originating Depository Financial Institution (ODFI), which may be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. The RDFI may, however, reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified.

Figure 2:
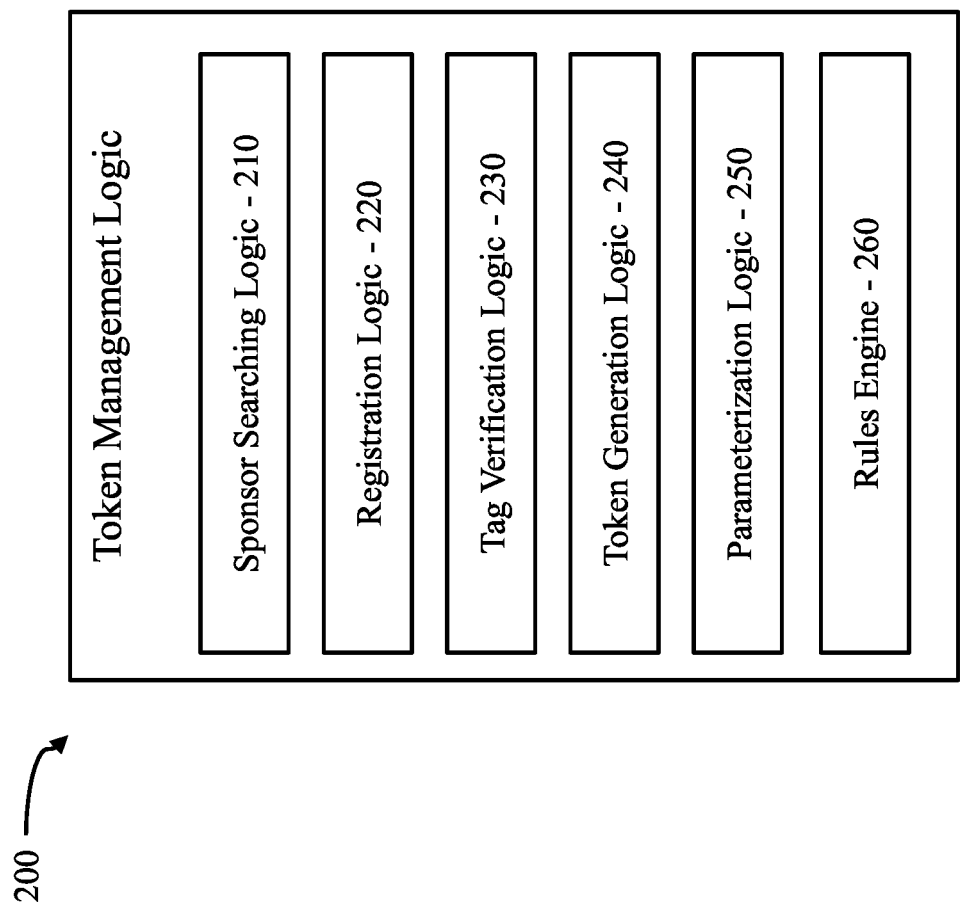
FIG. 2 is a block diagram of an illustrative token management logic that may manage unique digital tokens for unique tags in accordance with various potential embodiments.

FIG. 2 shows an example token management logic 200 in greater detail. As depicted, the token management logic 200 includes sponsor searching logic 210, registration logic 220, token authentication logic 230, token generation logic 240, parameterization logic 250, and a rules engine 260. Each token management logic depicted in system 100 may include all, or a subset, of the elements shown in FIG. 2.

The sponsor searching logic 210 may be configured to identify a sponsor of a token. For example, if the sender uses a token to identify a unique tag that is unrecognized at the computing system receiving the token, the sponsor searching logic 210 may be configured to receive the token and access an information directory to provide an identification of the unique tag and other information associated with that token.

In certain embodiments, the payment network implemented by the system 100 may be configured to interact with other affiliated payment networks (e.g., "Zelle," "PayPal," "CashEdge," and so on). In such an arrangement, if the token provided by, for example, sender computing system 110 or payment service computing system 130 is not recognized, the sponsor searching logic 210 may be configured to transmit inquiries to the other affiliated payment networks (e.g., in a predetermined sequence) to determine if the token is recognized at any of the other affiliated payment networks. If the recipient is registered with another payment network, then the funds may be transferred to the recipient by routing the funds through the other payment network.

The registration logic 220 may be configured to facilitate the process of registering new users. For example, in the preceding discussion, if the token is not recognized, and is not registered at any other affiliated payment network, then the registration logic may be configured to send the recipient a text message, e-mail, or other communication inviting the recipient to register with the payment network. Such a communication may include a link (e.g., a URL) to the website provided by the payment service computing system 130. The registration logic 220 may be configured to generate pages or screens for presentation to the user at the website or client application to facilitate the registration process. The registration logic 220 may also present pages or screens to the user in other scenarios (e.g., where the user has arrived at the website as a result of a search engine query, where the user has arrived at the website via another website, and so on). The registration logic 220 may create new database entries responsive to inputs received from the user.

The tag verification logic 230 may be configured to verify tags to confirm that the tag is not already taken and is thus available for use, or to verify that the tag is associated with a source of the tag (e.g., that the user who is attempting to register a cell phone number as a tag is indeed the owner of that cell phone number). (Herein, the term "own" in the context of telephone numbers refers to the telephone number being assigned to one particular user as opposed to being assigned to other users, and is not being used to refer to ownership as between the user and the phone carrier that provides the telephone number to the user. The term is used analogously in the context of e-mail addresses.) As an example, when a user enters a tag, the tag verification logic may determine that the tag is acceptable (e.g., satisfies known conventions for number and types of alphanumeric characters and does not include offensive language) and is unique (e.g., by cross-referencing a directory of tags). As another example, when a user attempts to register a new e-mail address, the tag verification logic 230 may perform an authentication operation such as sending the user an e-mail at the new e-mail address. The e-mail may, for example, contain a link that must be accessed by the user in order to successfully complete the registration process. In some embodiments, the registration logic 220 and/or the tag verification logic 230 may generate a unique tag (e.g., as a random alphanumeric sequence of a certain length, such as 8-20 characters, or a sequence that includes certain names, terms, dates, or other values associated with the user for which the unique tag is generated) and present that tag to the user. The registration logic 220 and the tag authentication logic 230 may cooperate to facilitate the registration of certain tags.

The token generation logic 240 may generate, for a unique tag, a digital token that is used in association with the unique tag. The digital token may comprise the unique tag, or a tokenized version of the unique tag. The digital token may also include other values that identify or that are otherwise associated with the user. The digital token may include, for example, various parameters, attributes, and/or rules applicable to the corresponding unique tag, and/or a network location for where the parameters, attributes, and/or rules are stored and accessible via a telecommunications network. In various embodiments, the digital token may also include certain identifiers needed for authentication (e.g., passcodes), routing of tokens (i.e., which computing systems or devices the token is authorized to be transmitted by or to be transmitted to), etc.

Parameterization logic 250 may be configured to assign certain parameter or attributes that define the functionality and/or usability of the digital token. The parameters are based on features selected by the user for the unique tag, features that define the purpose or usability of the unique tag, as further discussed below. The parameters may define or prescribe rules or restrictions to be applied to the unique tag corresponding to the digital token. It is noted that in some embodiments, more than one digital token may be generated for a unique tag, with each digital token intended for certain functionality or purposes. For example, for a unique tag, a different digital token may be generated for each kind of transfer (e.g., incoming, outgoing, payments, savings funds, investments, transfers requiring approval, etc.) associated with the unique tag, a different digital token may be generated for each user or account associated with the unique tag, etc. Certain digital tokens may be generated as single use tokens.

The rules engine 260 may be configured to apply rules to a unique tag based on the parameters of the digital token that corresponds to the unique tag. For example, the selected feature set for the unique tag may be translated to parameters that require certain funds transfer requests of certain users (e.g., ones by a child) to be approved by a custodian of the unique tag (e.g., a parent of the child), or that restricts certain funds transfers by category, amount, recipient (payee), location of the mobile device being used to initiate the funds transfer, location of the recipient (e.g., merchant or individual user), etc. Example potential features are discussed below.

Figure 3:
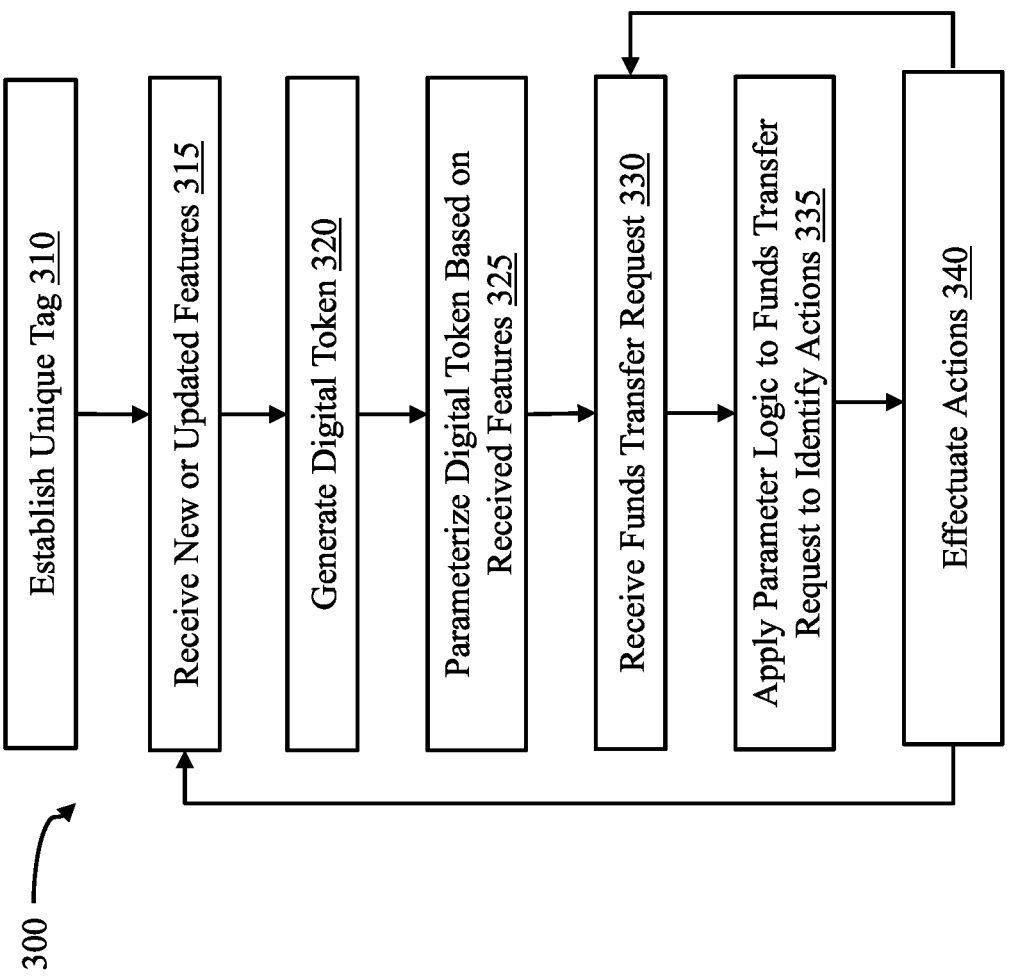
FIG. 3 is a flow diagram depicting an illustrative method in accordance with various potential embodiments.
Figure 5:
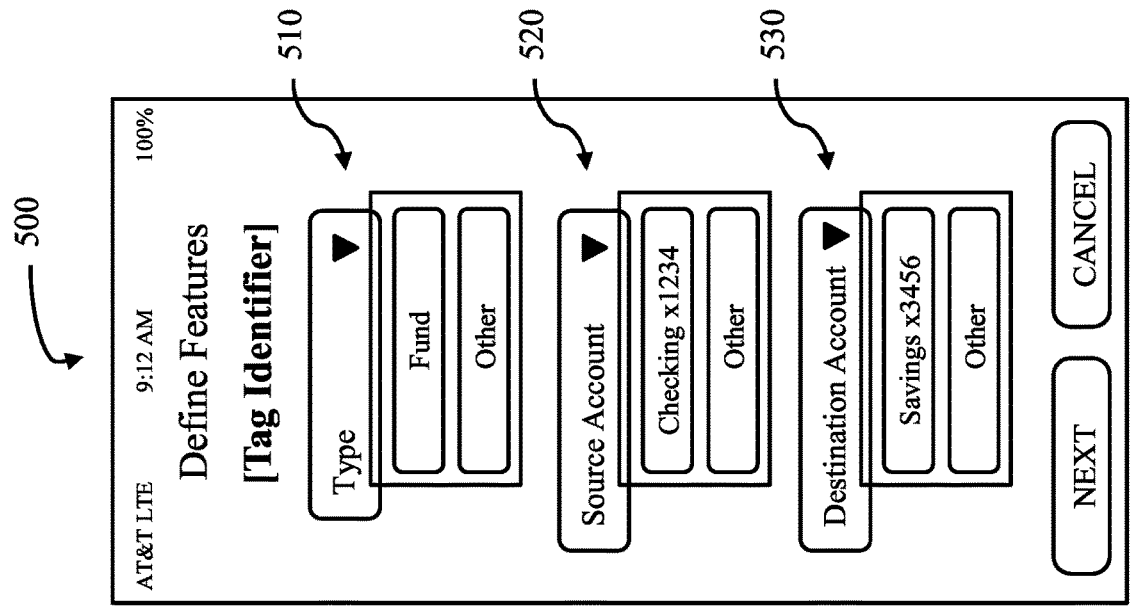

FIG. 3 depicts an example process 300 for using unique tags for multi-party transactions through system 100. At 310, a unique tag may be established. A user may select a unique tag, and if not already in use, that unique tag may be reserved and associated with that user and added to a directory of tags. In certain embodiments, a unique tag may be generated for the user, either as a matter of course or at the request of the user. At 315, the user may provide certain features for the unique token. As further discussed below, features may include identifying custodians and user, approval requirements, restrictions on usability, etc. At 320, one or more digital tokens corresponding to the unique tag is generated. The digital token may include the unique tag, or a tokenized version of it, and/or the digital token may include another unique identifier corresponding to the unique tag. At 325, based on the features selected by the user, the digital token may be parameterized. This may comprise assigning parameters or attributes to the digital token that define the rules to be applied to the unique tag. The parameters may be encoded as part of the digital token (e.g., sets of alphanumeric characters, each set corresponding to a parameter, such as [set 1: custodian identifier][set 2: user identifier][set 3: approval requirement][set 4: category restrictions]), and/or may be a dataset stored in a database that associates the dataset with the unique tag and that may be referenced (e.g., by a rules engine) through a telecommunications network such as the internet to identify usability or functionality corresponding to the unique tag.

At 330, a funds transfer request may be received in association with a unique tag. The digital token (and/or unique tag) may have been published (e.g., the unique tag itself and/or via an associated URL, QR code, etc.) for use by authorized users of the unique tag, or by third parties (e.g., individuals that may contribute to a funding campaign set up through the unique tag). The unique tag and/or digital token may be included or identified as part of the funds transfer request. At 335, the parameter logic (e.g., rules based on the parameters or attributes of the digital token) may be applied to the funds transfer request to determine how the funds request is to be handled (e.g., if approval or notification is required) or otherwise what actions are to be taken (e.g., if a funds transfer is to be permitted or rejected). At 340, the actions are effectuated (e.g., a notification or request for approval is transmitted to a computing device of a custodian, a transfer is made, etc.).

FIGS. 4-17 include examples of various potential graphical user interfaces which may be presented by a client application (e.g., a banking application, a standalone application of a payment platform such as "Zelle," or an internet web browser). These are representative, non-limited example interfaces, and do not necessarily include all potential functionality of various embodiments. Similarly, not all the functionality depicted is necessarily required in all embodiments.

Figure 4:
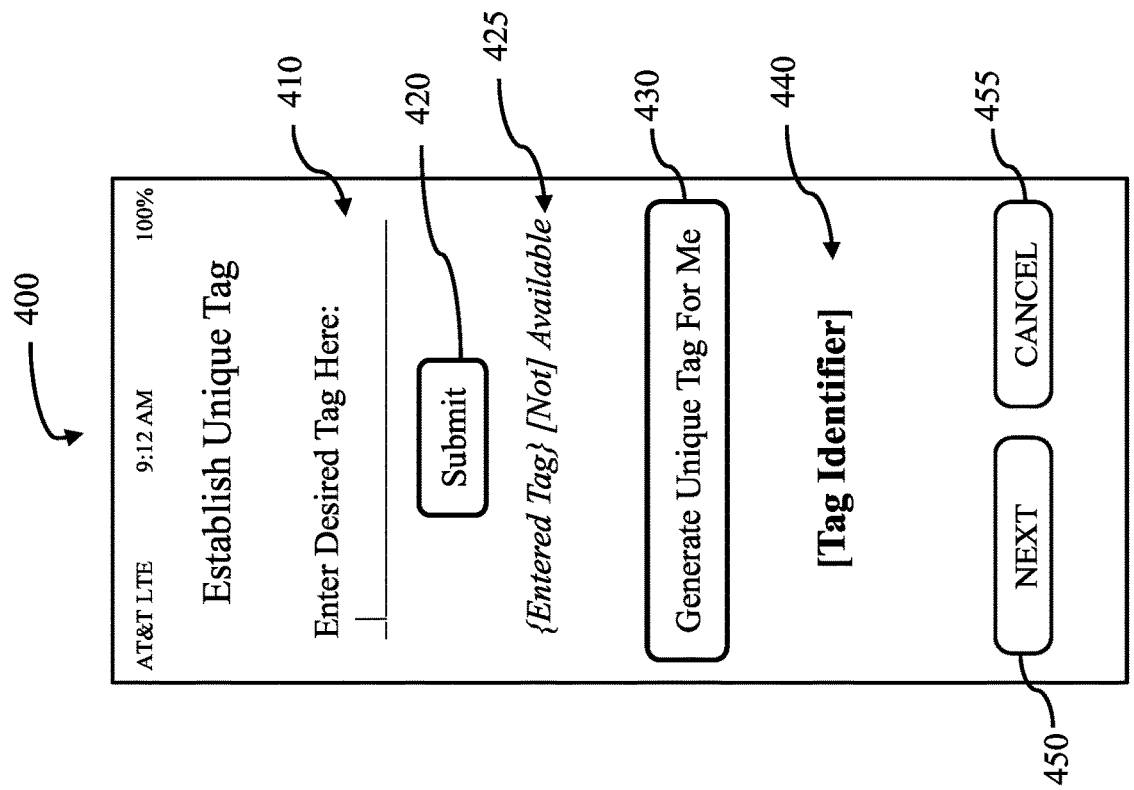
Figures 6, 7:
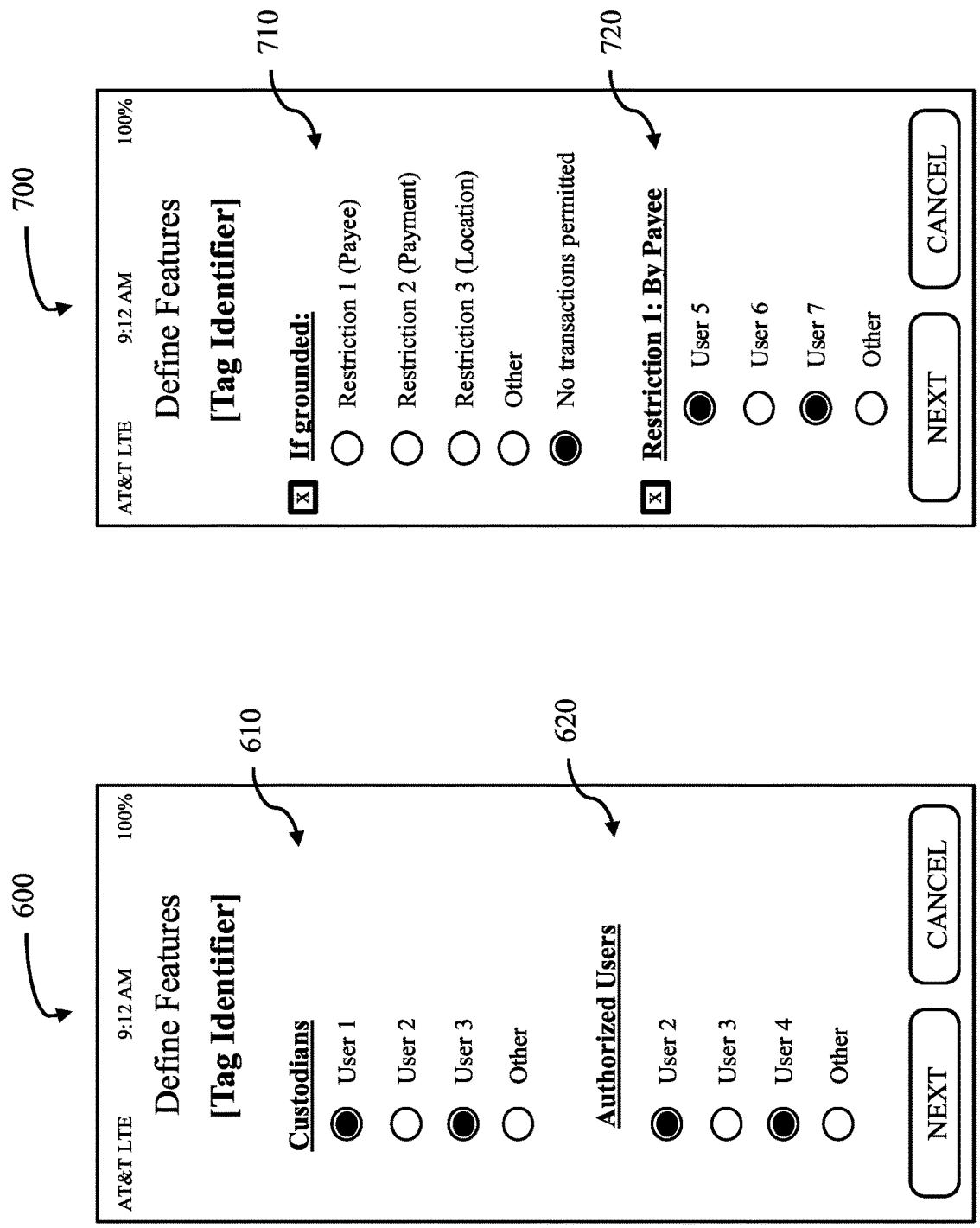
Figures 8, 9:
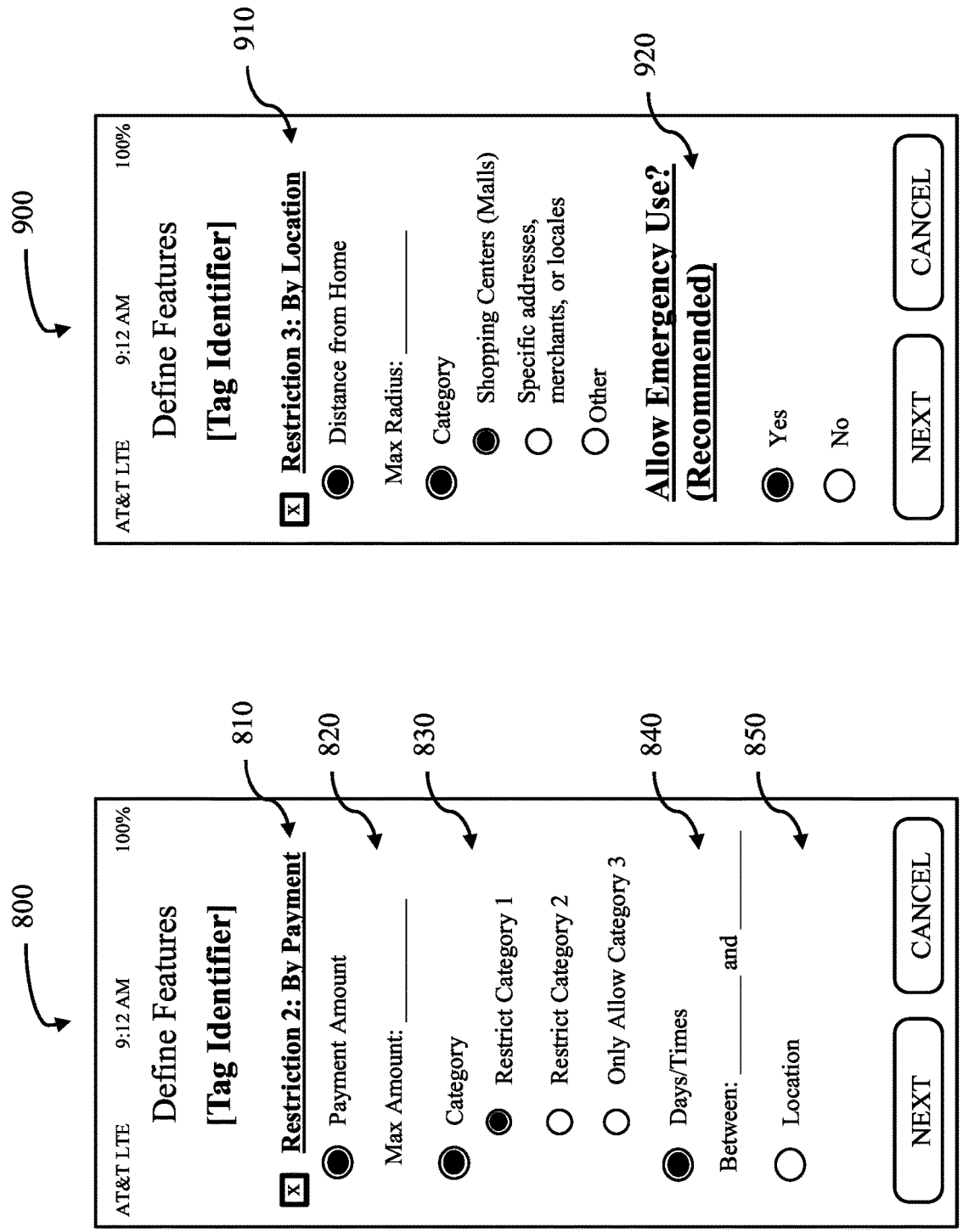
Figure 17:
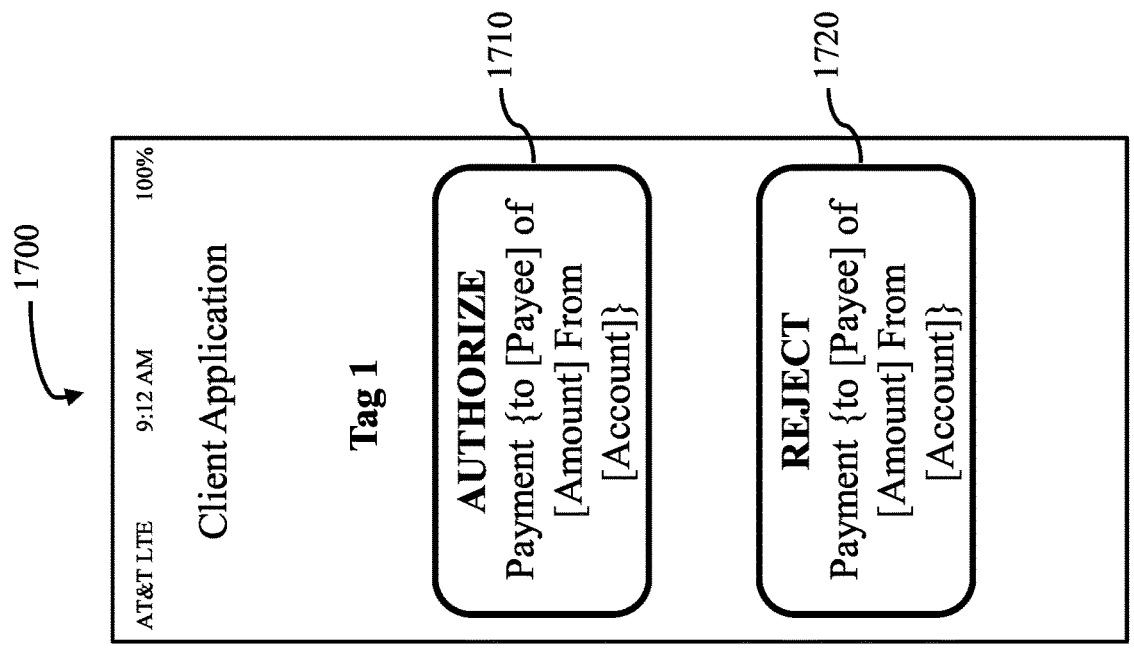
Figure 16:
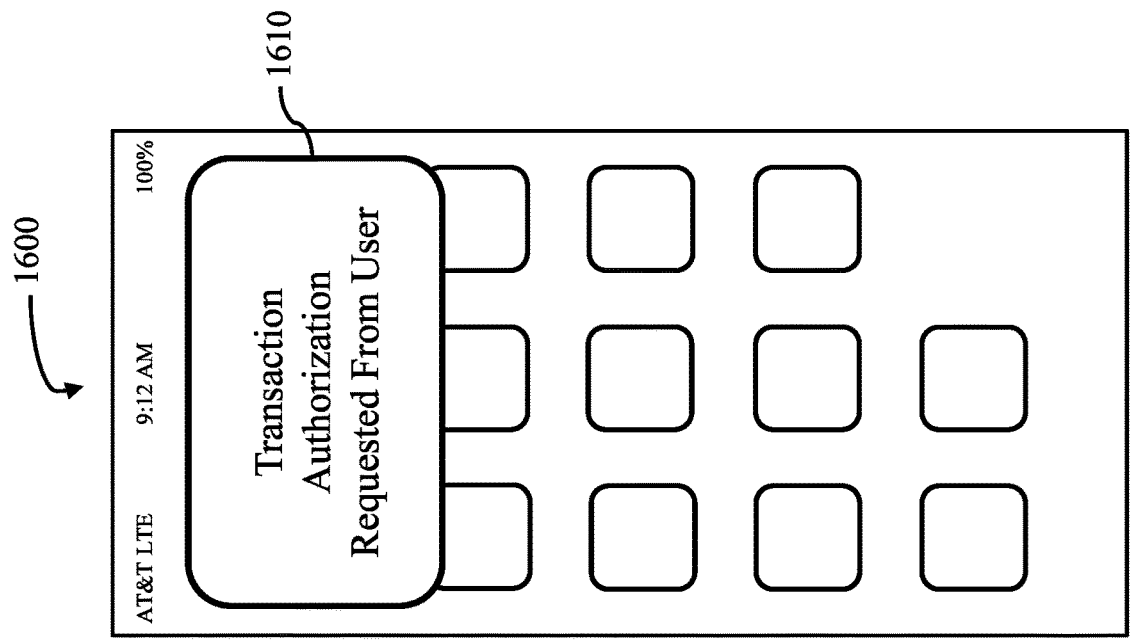

Interface 400 in FIG. 4 allows a user to establish a unique tag by entering a unique identifier (410) and selecting a submit button (420). The entered tag may be searched, and an indication provided as to whether the entered tag is or is not available for use (425). Interface 400 also provides a generate tag button (430) for automated generation of a tag identifier that is unique (i.e., not already taken by another user or otherwise not already in use and meeting certain requirements such as length and non-offensiveness). The unique tag identifier (e.g., "Bill's_Expenses2022" or "Johnny's_College_Fund_Class_of_2030") may then be presented at 440. The user may select a next button 450 to proceed, or a cancel button 455 to cancel registration of the unique tag. It is noted that not all interfaces may be required (e.g., interface 400 is no longer required after a unique tag is established and only certain features are to be updated), nor are they necessarily limited to being presented in a particular sequence.

Interface 500 allows the user to select a type for the unique tag (510). Example types allow for the unique tag to represent a "Family Account" on a payment platform (e.g., "Zelle"), with parental review and/or approval of payees and/or payments, and/or parental alerts on payments or receipt of funds (via, e.g., text, email, and/or push notifications). As another example, a unique tag may be established for a "Fund" that is a funding or savings campaign (e.g., for college, a car, a vacation, a school trip, a mission, a charity drive, etc.). A unique tag may be established for investing, gifting, etc. Interface 500 also allows for selection of a source account (520) and/or a destination account (530).

Interface 600 allows the user to select users that will serve as custodians of a unique tag (e.g., parents that approve payees and/or payments) (610) and authorized users (e.g., children that may use the unique tag with prescribed restrictions) (620).

Interface 700 allows for activation of a grounding feature (710), which if enabled for a user (i.e., if a user is "grounded"), certain specified restrictions may be applied (e.g., restrictions defined by payee, payment amount, location, etc.). Interface 700 also allows the user to define a restriction by payee (720), such that only selected users are permitted to receive funds (whitelisted), or such that selected users are not permitted to receive funds (blacklisted). In various embodiments, a restriction feature may be defined, and the feature may at the same time or at a later point be activated by selecting the restriction (and thereby placing an "X" in the box to the left of the restriction) or deactivated by selecting the restriction again (and thereby removing the "X" in the box).

Interface 800 allows the user to define (and activate or deactivate) restrictions by payments (810), such as a maximum limit on funds transfers (820), categories that are allowed or not allowed (830), time periods during which funds transfers may be made, such as 8 am to 6 pm so as to restrict purchases at night, or 3 μm to 7 am during weekdays so as to restrict funds transfers or payments during school hours). Funds transfers may also be limited based on a location of the user device being used to initiate a funds transfer or payment request (850). The location may be detected using a GPS or other location sensor of the user device, or determined in other ways discussed herein.

Interface 900 allows the user to define (and activate or deactivate) restrictions by location, such as by distance from a location (e.g., a maximum radius from a location defined as, or determined to be, "Home"), or by category (e.g., shopping malls, specific addresses, merchants, countries, states, provinces, or locales, such as neighborhoods or districts). Interface 900 also allows the user to indicate that, even though restrictions or limitations are to be placed on funds transfers or payments corresponding to the unique tag, certain funds transfers or payments deemed to be for emergency use are nonetheless permitted without approval even if otherwise not permitted (920). That is, restrictions can be overridden if certain conditions are satisfied. In certain embodiments, an emergency (or "override" situation) may be inferred from or otherwise based on the circumstances, with various factors taken into account in determining whether there is an "emergency" use, such as location, time, and/or type of purchase. For example, if a location of a mobile device (e.g., as detected using the GPS sensor of the mobile device) that is being used for a payment is located away from home during certain hours (e.g., the payment request is being made at night), and/or the payment is for transportation services (e.g., an "Uber," a "Lyft," a taxicab, a city bus, or a subway train), then a payment may be authorized without requiring approval. This would allow, for example, a dependent (e.g., a child) to make it home safely. In various embodiments, determinations of whether there is an emergency may employ artificial intelligence. For example, a machine learning model may be trained (e.g., using supervised or unsupervised machine learning, neural networks, etc.) to receive, as inputs, a set of circumstances (e.g., time, location, amount, merchant, history of transactions), and output a determination as to whether an emergency is suspected. Depending on confidence in that determination (e.g., if confidence in the determination that a use is an emergency use exceeds a threshold, such as 50%, 75%, or 90%), a funds transfer may be permitted. In certain embodiments, the parent or other custodian may be alerted (e.g., through a push notification, text message, etc.) when a use is determined to be an emergency use and/or a restriction is otherwise overridden.

As indicated above, in various embodiments, "location" of a user may be determined using a GPS device or other component of a mobile computing device (such as a smartphone) of the user. In various embodiments, location may alternatively or additionally be determined (or verified) in other ways. For example, to determine or verify the location of a first user, a request (e.g., text message or push notification) may be sent to a mobile device of a second user (e.g., a sibling of the first user) to make a selection via an interface the mobile device to provide, or verify, the location of the first user. Additionally, location may be determined based on audio or video detected using a smart device of the first user or another user. For example, an audio, image, or video file may be acquired from a smart device, and if the user's biometrics (e.g., voice signature or facial features) are detected in the file, the location of the device used to capture the audio, image, or video file may be used to infer the location of the user. A user's biometrics may be submitted to a client application when establishing or updating a unique tag to include the user (e.g., by submitting voice samples and/or photos). Another method of identifying location may be a location of an attempted transaction (e.g., the known or cross-referenced location of a brick-and-mortar merchant).

Interface 1000 allows for a requirement for approval feature (1010) to be applied to the unique tag. The approval requirement may be based on (triggered if) an amount of the funds transfer or payment exceeding a specified amount (1020), based on time (1030), based on payee (1040), and or based on category (1050), such that certain specified categories require approval (i.e., are blacklisted) or certain specified categories are permitted (i.e., are whitelisted). Interface 1000 allows a user to indicate that all transaction require approval (1060), with the exception of "emergency use" if selected (920).

Interface 1100 allows for selection of alerts to be sent to one or more custodians (1110) based on amount (1120), time (1130), payee (1140), category (1150), or for all transactions (1160). Interface 1100 also allows for selection of alert modes, such as text messages and/or push notifications at a specified mobile number (1180) and/or email (1190).

Interface 1200 allows for publication (1210) of a unique tag (or representations thereof) for use by others. For example, a QR code may be generated for display, such that scanning of the QR code automatically selects or associates an action (e.g., a payment) with the unique tag (e.g., one or more users or accounts associated with the unique tag). Other potential manners of publication include, for example, generation of a URL (e.g., a hyperlink to a website for a funding campaign), text and/or email messages, and/or posts on a social media account (e.g., "Facebook" or "Twitter"). The user may also select recipients, individually or by selecting a predefined group of one or more users or other entities, such as "List 1" or "List 2" (1220). The user may also add a message or post to be sent, associated, or included with a selected publication (1230). The message may explain the goal and encourage recipients to contribute. QR codes may be generated for funds transfers (e.g., allowing a user to send or receive a transfer by scanning a QR code that identifies the unique tag), gifting (e.g., transfer of stock), tithing, etc.

Interface 1300 allows for addition, incorporation, integration, embedding, or association of various audiovisual resources with the unique tag and/or publication, alerting, or otherwise management thereof (1310). For example, the user may add an image (e.g., a photo in a photo album of a smartphone (which may be used to identify facial features and generate a facial biometric profile), or a file stored on or accessible to the user device), audio files (e.g., recorded spoken messages (which may be used for generating a biometric voice signature), jingles, or other sounds), video files, emojis, etc., to be shared along with alerts, requests for authorization, or sharing of URLs for fundraisers. Interface 1300 also allows for addition of documents (1320), which may be saved as a photo or in a file. In various embodiments, the unique tag may have a "scan mode" that allows for various documents to be scanned and subsequently shared. For example, vaccination cards, standardized test scores, report cards, private medical records (e.g., prescriptions for eyeglasses or medicines or test results), and the scanned documents can be shared through various means upon request through one or more interfaces of the client application.

Interface 1400 is an example "custodian" (e.g., parent) view that identifies all users (e.g., in a "family account") and allows for determination of their statuses and activities. If a user is grounded (e.g., a set of restrictions is to be applied), the grounding may be indicated on the parent view (1415). If there are transactions or other activities (e.g., movements and detected locations) (1440), the parent may choose to view the activities.

Each user (1410, 1430) in interface 1400 may have an associated image (e.g., a photograph or other imagery) (1420). In various embodiments, the image may be a static image associated with the user. In other embodiments, the image may indicate, or may be based on, current circumstances (e.g., based on most-recently obtained data, such as those obtained in the past hour). For example, the image may include a portion of a map, with an indicator marking the current location of the user on the map. In other embodiments, the image may include an indicator (e.g., a flashing red circle or other shape) to indicate, for example, the user has been deemed to be in an "emergency" situation (i.e., one in which a payment or other funds transfer was permitted, despite restrictions or grounding, because the system determined that the circumstances indicated that the attempted funds transfer was an emergency use. Selecting the image may then link the user to a map, provide directions, present current or predicted trajectory of movements (e.g., if in a vehicle, such as a bus that is on a route that leads to home), or to attempt to make a call or send a text or other message to determine if the child is safe.

Interface 1500 provides an example user interface for an authorized user (e.g., a child) that is limited with respect to the custodian (e.g., parent) view. Interface 1500 includes a listing of unique tags with which the user is associated or linked, and information on each unique tag. A first tag ("Tag 1") in interface 1500 is indicated as being a payment tag, allowing the user to make funds transfers or payments to third-parties (1520). The user may choose to make a funds transfer to a certain payee of a certain amount. If a restriction does not permit a transfer to the payee and/or for the specified amount, the user may make a selection to transmit a request authorization to a custodian device (e.g., a device of a parent) to allow the custodian to select (via a user interface) to make an exception for the payment or other funds transfer. As depicted in interface 1600, if such as request is made, a pop-up notification (1610) may be generated on a device of the custodian, selection of which may open a client application or otherwise provide options, such as those depicted in interface 1700. For example, the custodian may be permitted to make a selection to authorize (1710) a certain funds transfer or to reject (1720) the funds transfer.

Interface 1500 also lists a second unique tag ("Tag 2") (1530), which is a unique tag for funding a goal. Interface 1500 may include, for unique tags associated with a funding or other goal (e.g., a "fund" tag), a progress indicator (1540) to indicate how much funds have been received relative to the goal.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for providing the overall system or portions of the embodiments might include general purpose computing in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
   receiving, from a first computing device of a first user of a digital payment platform, a request for a unique tag having a set of features, wherein the set of features identifies a second user and a restriction on transactions initiated by the second user;
   generating, by a processor of a computing system, a unique digital token based on the unique tag;
   parameterizing, by the processor, the digital token by assigning a set of parameters to the digital token based on the set of features, wherein assigning the set of parameters to the digital token comprises encoding the set of parameters as part of the digital token;
   receiving, from a second computing device of the second user or a third computing device of a third user, by the processor, a transaction request for a funds transfer or a payment to be made through a payment network, the transaction request identifying or including at least one of the unique tag or the digital token; and
   applying, by the processor, the restriction to the funds transfer or the payment based on the set of parameters of the digital token.

2. The method of claim 1, wherein the unique digital token is multi-modal, and wherein the set of parameters imposes a mode to the digital token.

3. The method of claim 2, wherein the mode is a first mode enabling one or more funds transfers or payments using the digital token.

4. The method of claim 3, wherein the first mode corresponds to automated transfers transmitted to one or more identified computing systems.

5. The method of claim 2, wherein the mode is a second mode enabling importation of data or documents in association with the unique tag.

6. The method of claim 5, wherein imported data or documents are routed to an identified digital location.

7. The method of claim 1, wherein the restriction imposes heightened security requirements for the funds transfer or the payment.

8. The method of claim 1, wherein the digital token identifies or includes the set of parameters.

9. The method of claim 1, wherein the digital token identifies or includes one or more digital locations via which the set of parameters is accessible.

10. The method of claim 9, wherein the digital token further identifies or includes one or more security measures required for access to the set of parameters at the one or more digital locations.

11. The method of claim 1, wherein the set of parameters triggers an alert to one or more computing devices of one or more identified users.

12. The method of claim 1, wherein the set of parameters triggers a requirement for authorization by one or more identified users before proceeding with the funds transfer or the payment.

13. The method of claim 1, further comprising publishing the unique tag to one or more computing devices of one or more users.

14. The method of claim 13, wherein publishing the unique tag comprises generating a unique code and transmitting the unique code to the one or more computing devices.

15. The method of claim 14, wherein the unique code is a QR code.

16. The method of claim 1, wherein applying the restriction comprises transmitting a request for authorization to a fourth computing device of a fourth user, and refusing the funds transfer or the payment in response to not receiving authorization from the fourth computing within a predetermined time following transmission of the request.

17. The method of claim 1, wherein applying the restriction comprises transmitting a request for authorization to a fourth computing device of a fourth user, and approving the funds transfer or the payment in response to receiving authorization from the fourth computing device following transmission of the request.

18. The method of claim 1, wherein applying the restriction comprises refusing the funds transfer or the payment based on a recipient of the funds transfer or the payment.

19. The method of claim 1, wherein the payment network is the digital payment platform.

20. A computing system having one or more processors configured to:
   receive, from a first computing device of a first user of a digital payment platform, a request for a unique tag having a set of features, wherein the set of features identifies a second user and a restriction on transactions initiated by the second user;
   generating a unique digital token based on the unique tag;
   parameterizing the digital token by assigning a set of parameters to the digital token based on the set of features, wherein assigning the set of parameters to the digital token comprises encoding the set of parameters as part of the digital token;
   receiving, from a second computing device of the second user or a third computing device of a third user, a transaction request for a funds transfer or a payment to be made through a payment network, the transaction request identifying or including at least one of the unique tag or the digital token; and
   applying the restriction to the funds transfer or the payment based on the set of parameters of the digital token.

* * * * *